United States Patent [19]

Hiraga

[11] Patent Number: 5,768,240
[45] Date of Patent: Jun. 16, 1998

[54] OPTICAL DISK RECORDING/ REPRODUCING APPARATUS

[75] Inventor: Takayoshi Hiraga, Yokosuka, Japan

[73] Assignee: Kabushiki Kaisha Kenwood, Tokyo, Japan

[21] Appl. No.: 686,457

[22] Filed: Jul. 25, 1996

Related U.S. Application Data

[63] Continuation of Ser. No. 361,239, Dec. 21, 1994, abandoned.

[30] Foreign Application Priority Data

Dec. 29, 1993 [JP] Japan ................................. 5-351199

[51] Int. Cl.⁶ .......................... G11B 17/04; G11B 33/02
[52] U.S. Cl. ................... 369/75.2; 369/77.1; 369/77.2
[58] Field of Search ................... 369/75.2, 77.1, 369/77.2

[56] References Cited

U.S. PATENT DOCUMENTS

| | | | |
|---|---|---|---|
| 4,497,051 | 1/1985 | Takahashi et al. | 369/77.1 |
| 4,592,039 | 5/1986 | Toyoguchi et al. | 369/75.2 |
| 5,299,185 | 3/1994 | Salkuai et al. | 369/75.2 |
| 5,301,176 | 4/1994 | Kawachi et al. | 369/75.2 |
| 5,355,357 | 10/1994 | Yamamori et al. | 369/75.2 |

FOREIGN PATENT DOCUMENTS

| | | |
|---|---|---|
| 0391424 | 10/1990 | European Pat. Off. . |
| 0437091 | 7/1991 | European Pat. Off. . |
| 0518259 | 12/1992 | European Pat. Off. . |
| 5-28613 | 2/1993 | Japan . |
| 4332615 | 6/1994 | Japan . |
| 2218254 | 11/1989 | United Kingdom . |

*Primary Examiner*—Stuart S. Levy
*Assistant Examiner*—William J. Klimowicz
*Attorney, Agent, or Firm*—Sixbey, Friedman, Leedom & Ferguson, P.C.; Gerald J. Ferguson, Jr.; Evan R. Smith

[57] ABSTRACT

CDs and MDs are recorded/reproduced by using the same disk motor and optical pickup so that the cost and space of the recording/reproducing apparatus can be reduced. Shafts formed upright on the clamper arm for supporting a clamper are inserted into bifurcated prolong holes of main sliders and L-character shaped prolong holes of main side plates, and are biased by springs. A holder for holding an MD cartridge moves as a subsidiary slider is moved backward so that the MD can be attracted to a turntable. When the main slider is moved forward, the clamper arm is moved backward and is not allowed to move downward. A CD is transported onto the turntable by a loading roller. As the main slider moves forward thereafter, the clamper arm 7 lowers to clamp the CD.

5 Claims, 21 Drawing Sheets

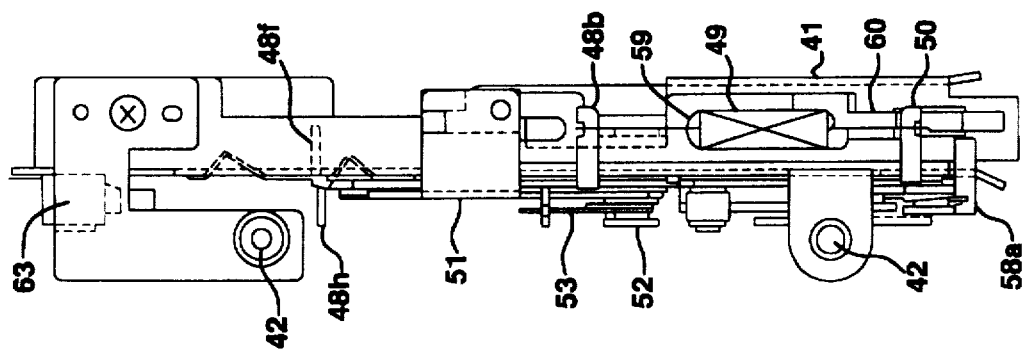
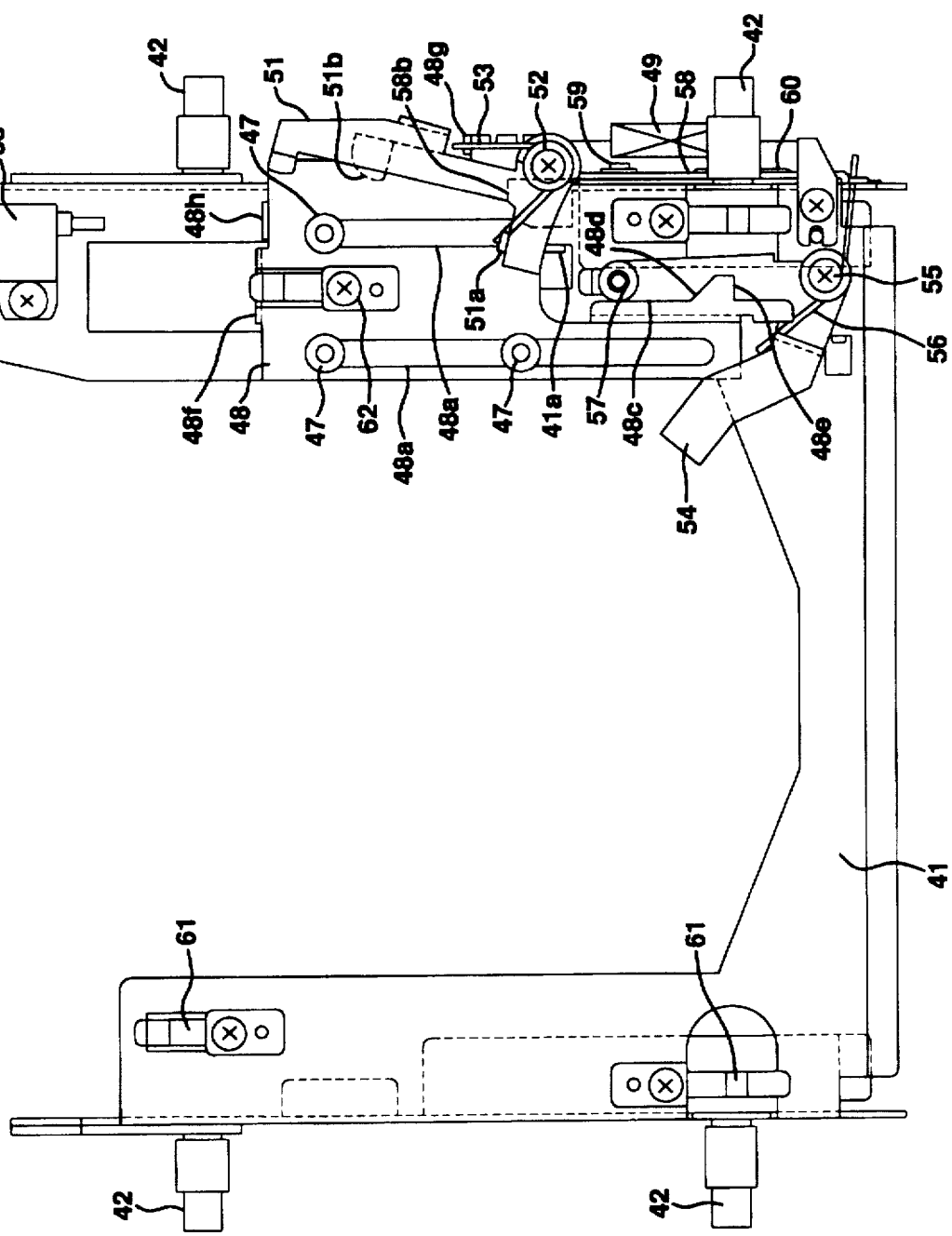
FIG.6B
FIG.6A

FIG.10A  FIG.10C  FIG.10B
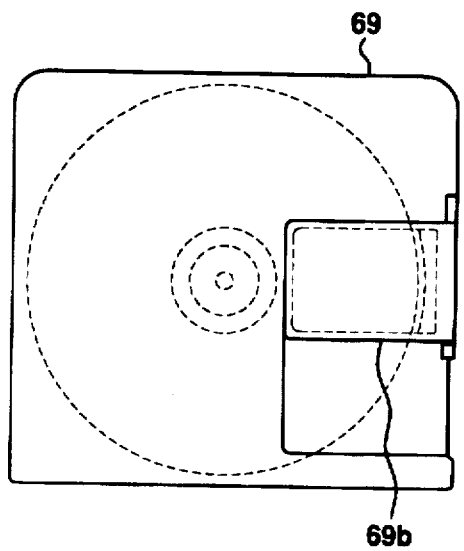
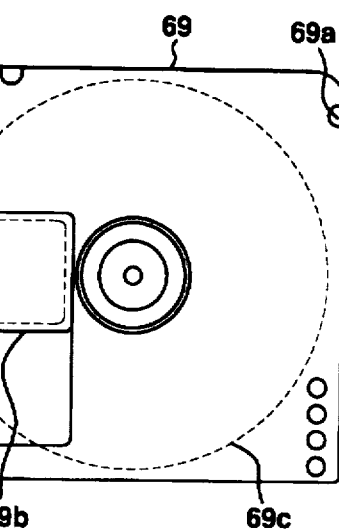
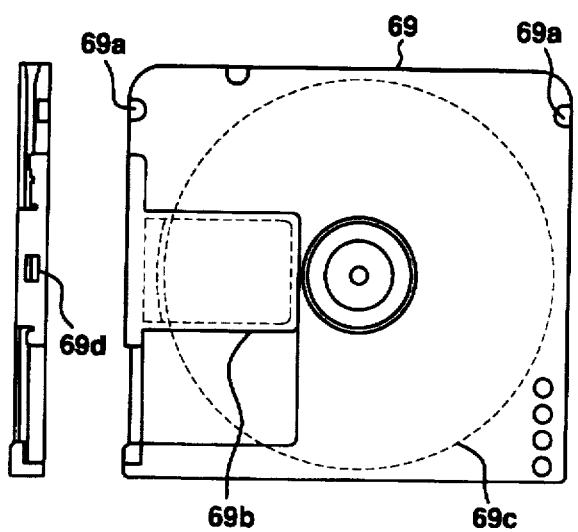
FIG.10D
FIG.11
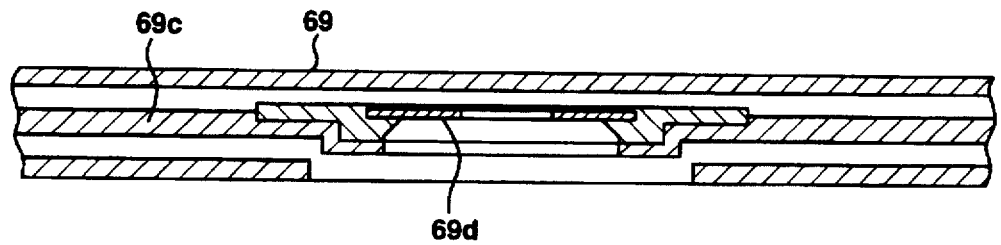

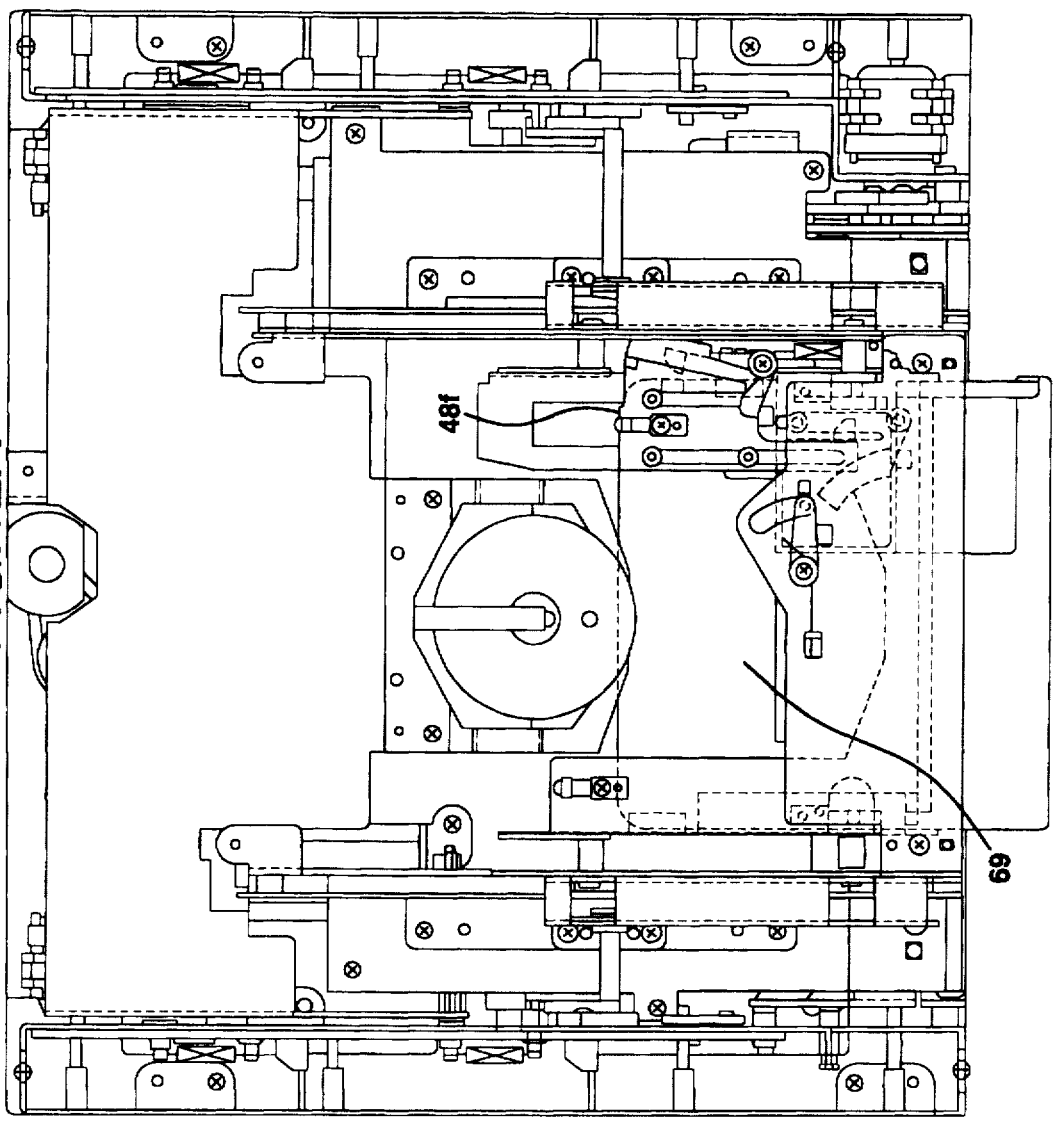
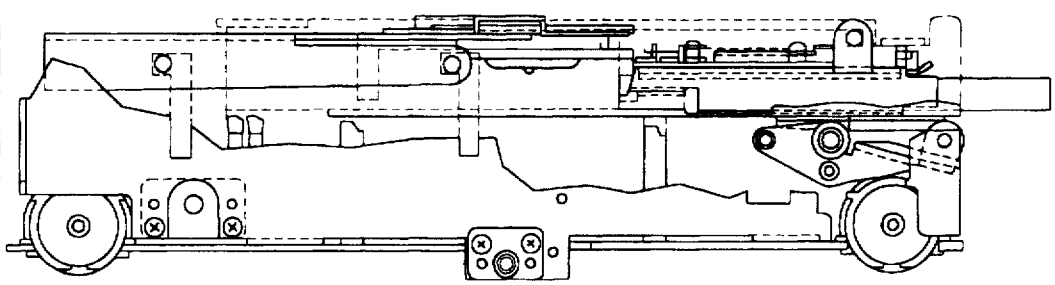

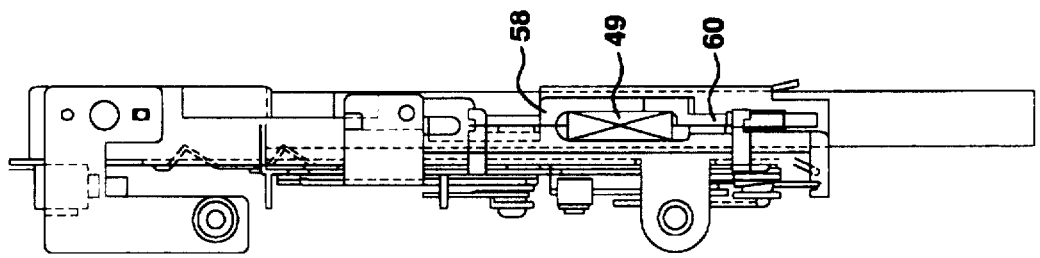
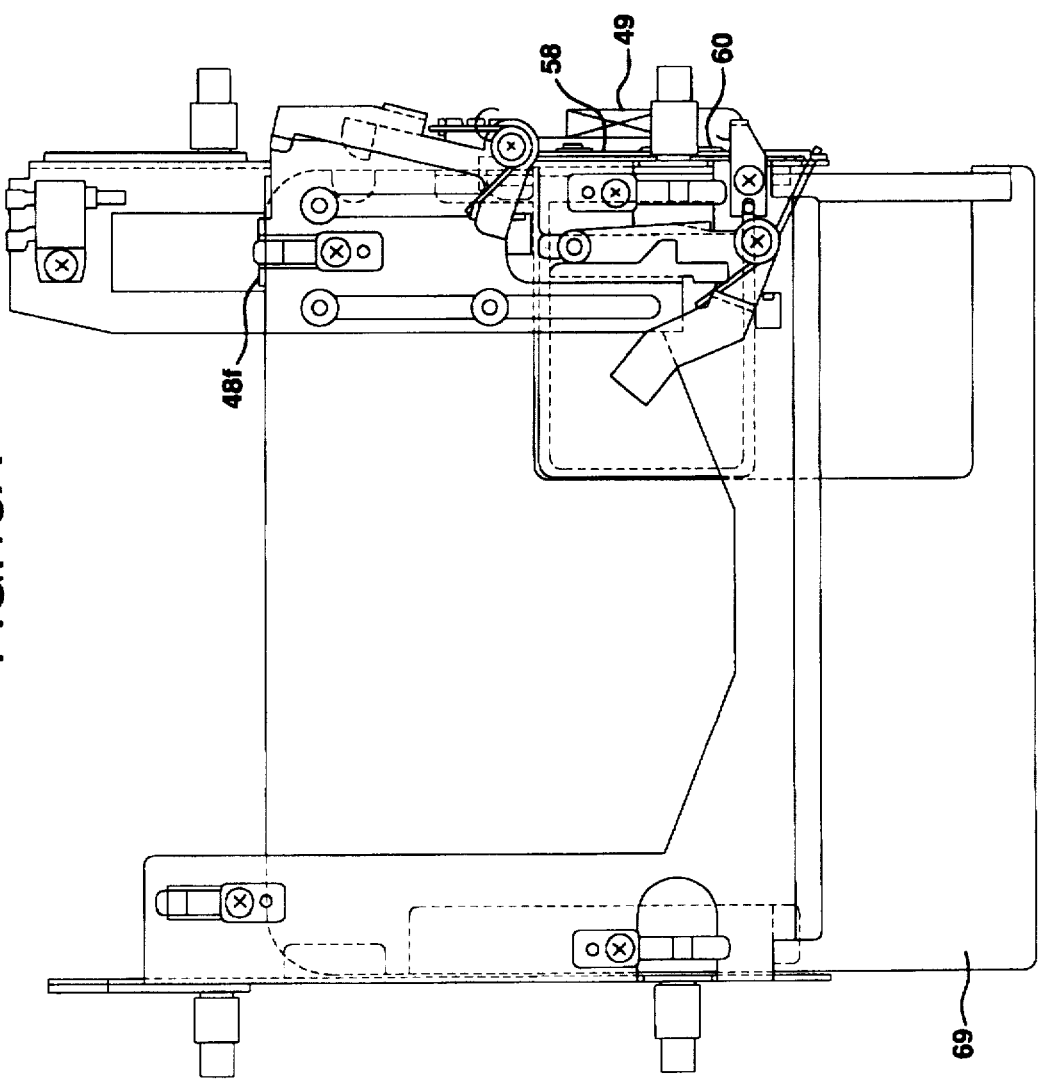

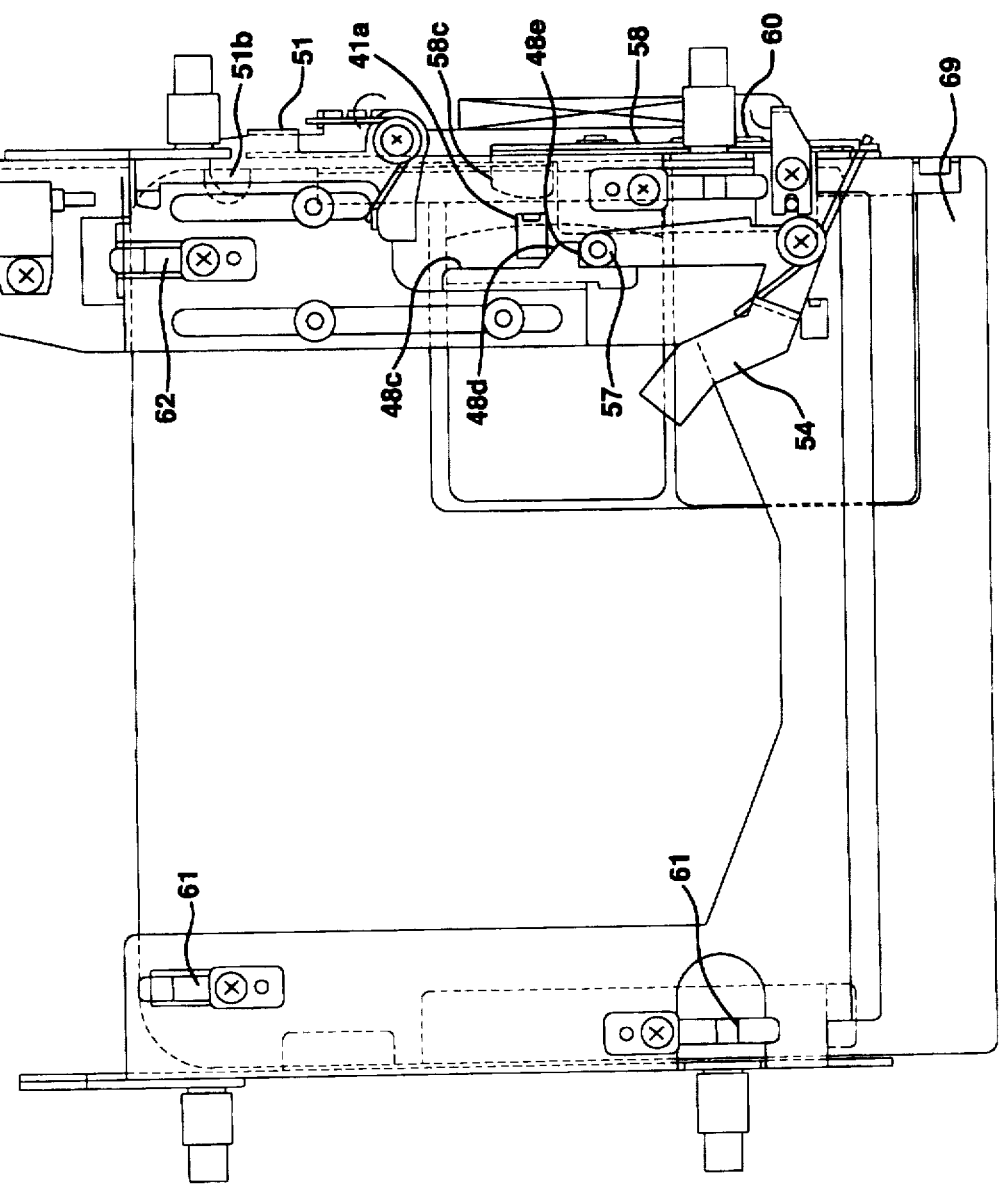

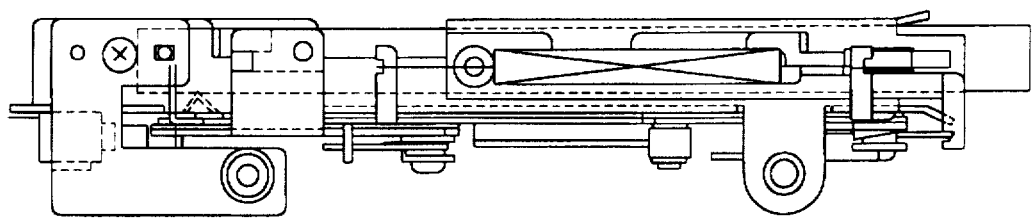
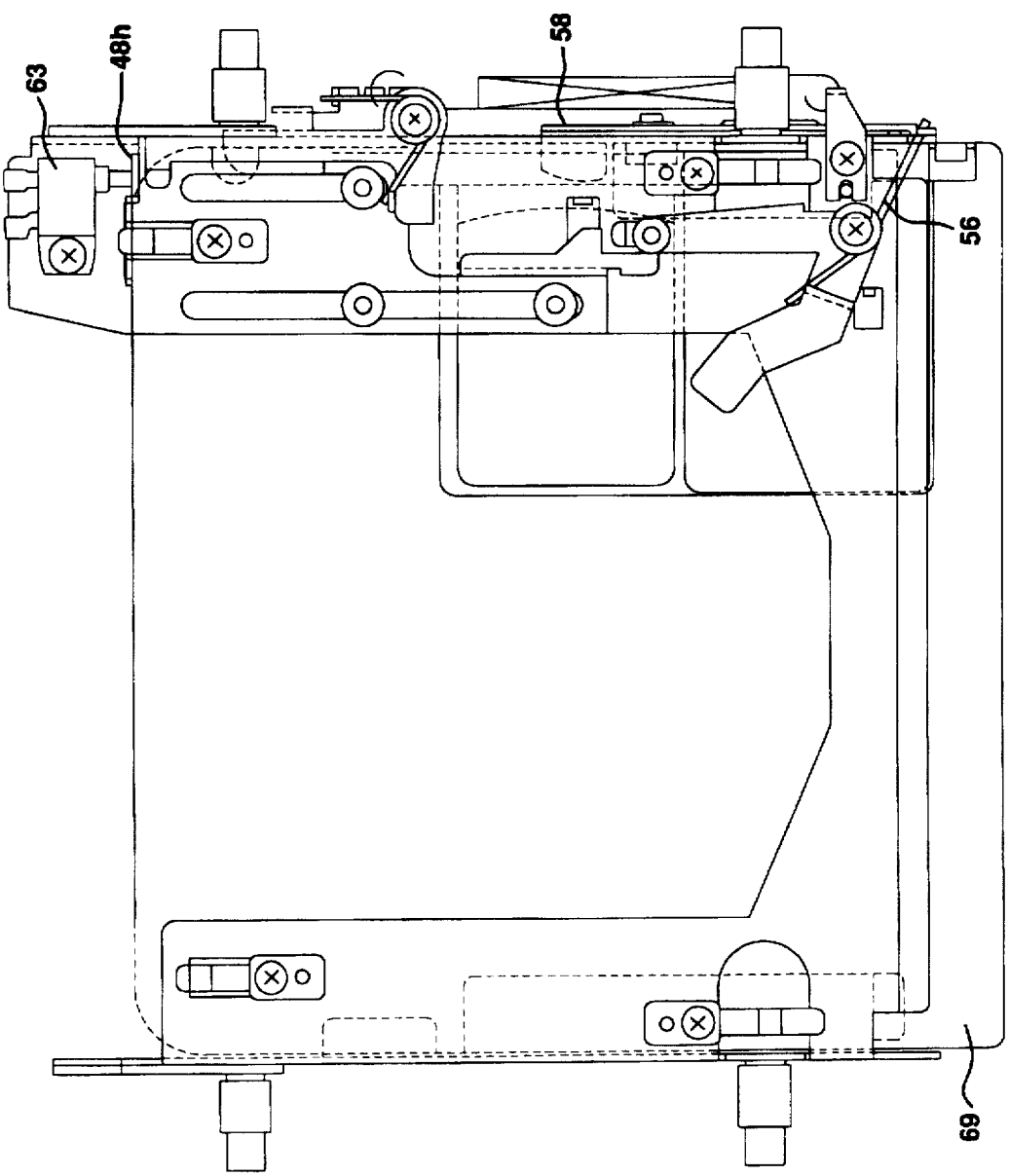

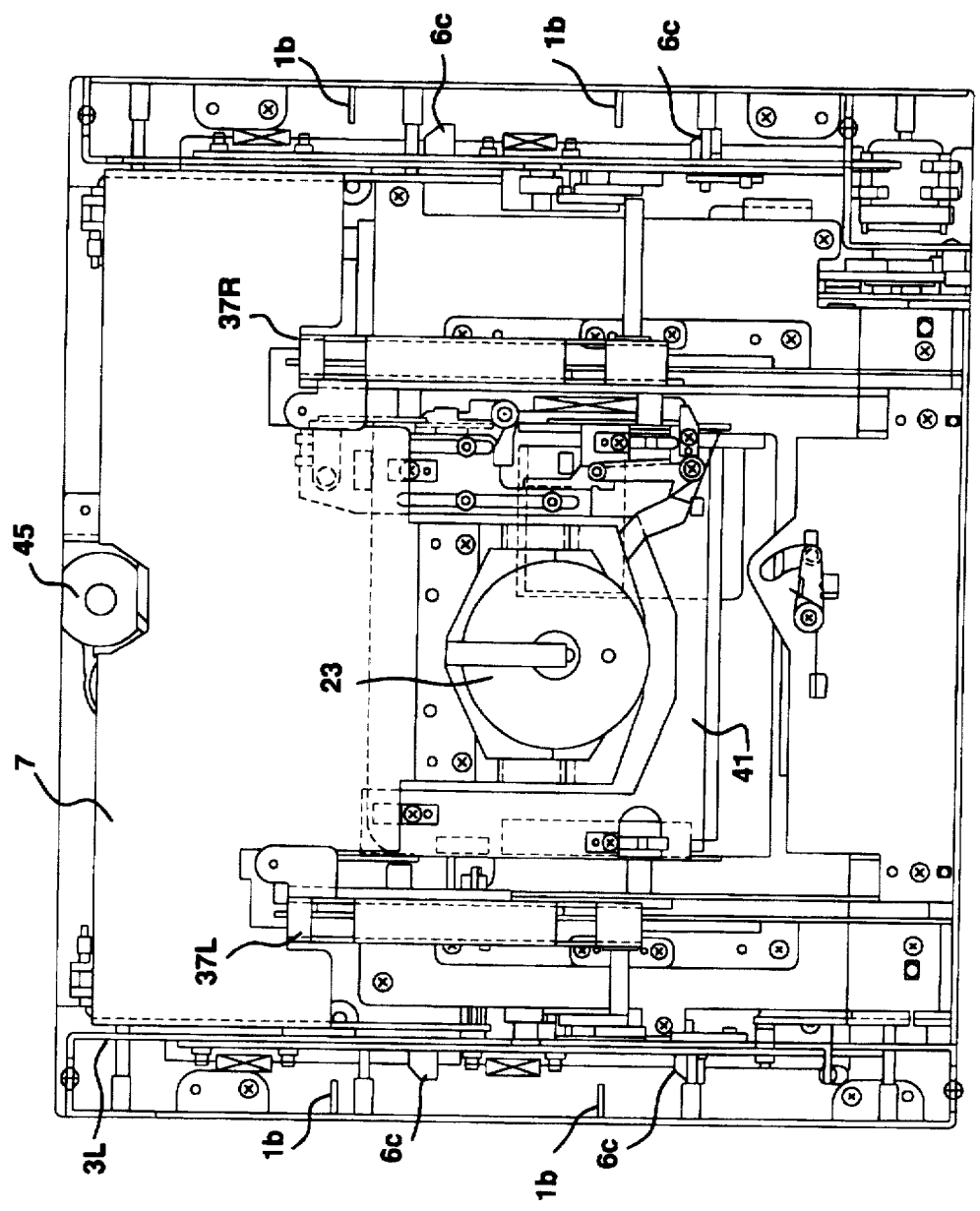
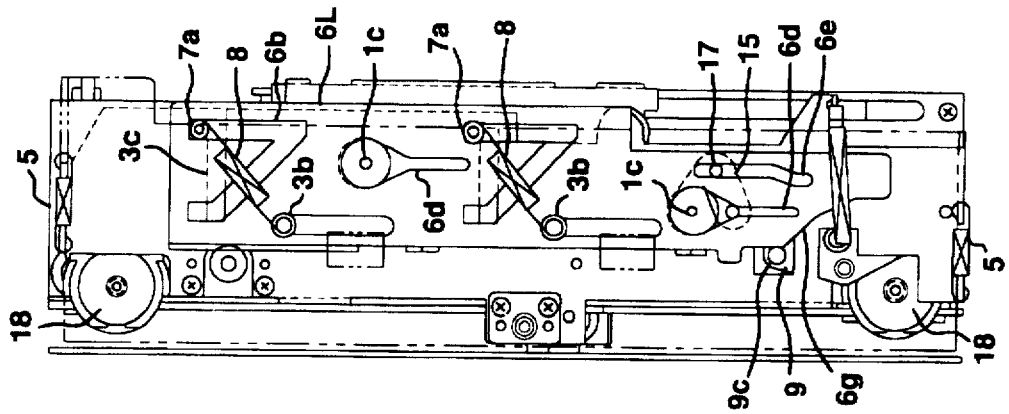

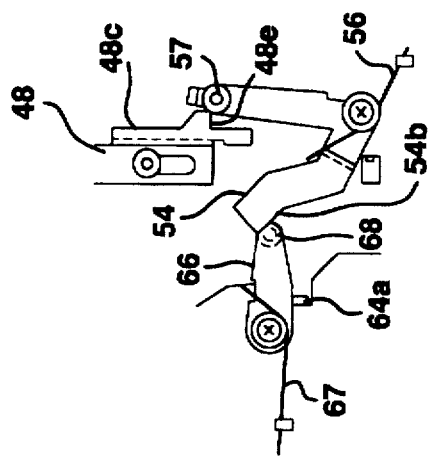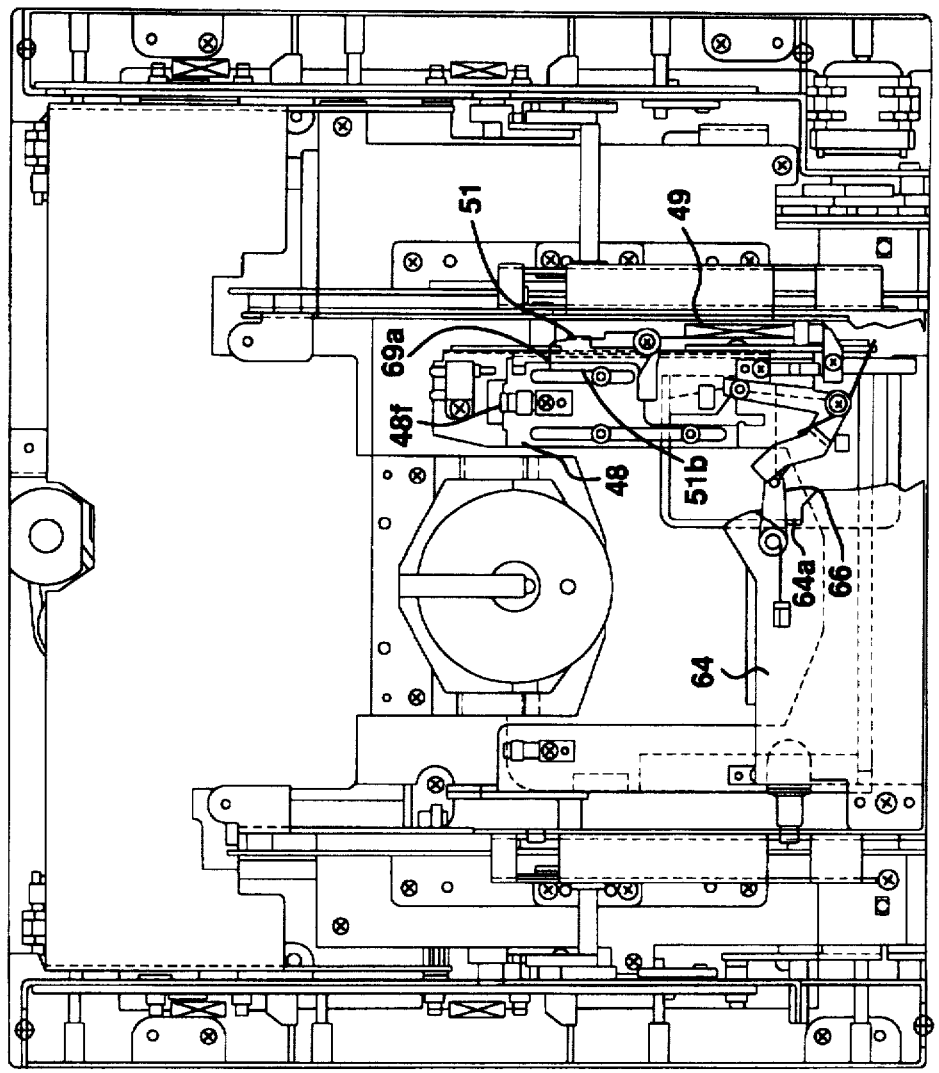

OPTICAL DISK RECORDING/REPRODUCING APPARATUS

This application is a Continuation of Ser. No. 08/361, 239, filed Dec. 21, 1994, now abandoned.

BACKGROUND OF THE INVENTION

1. Field of the Invention

The present invention relates to an optical disk recording/reproducing apparatus, and more particularly to an optical disk recording/reproducing apparatus capable of recording/reproducing data to/from both a so-called mini disk with an optical disk housed in a cartridge and a so-called compact disk with an optical disk not housed in a cartridge, by using the same disk motor and optical pickup.

2. Related Background Art

A rewritable optical disk called a mini disk (hereinafter represented by a MD where applicable) is known, and an MD recording/reproducing apparatus is available in markets. A reproduction only optical disk called a compact disk (hereinafter represented by a CD where applicable) is also known, and a CD reproducing apparatus and a reproducing apparatus capable of reproducing data from both a CD and an optical disk other an MD such as a video disk are also available in markets.

The same point common in both CD and MD is that data is reproduced by receiving a laser beam spot radiated to a record track from an optical pickup and reflected from the track, by a light receiving element. There are however different points between CDs and MDs as described in the following. An MD is housed in a cartridge with a hole and a shutter which are used recording/reproducing data. However, a CD is not housed in a cartridge.

An MD is mounted on a turntable by attracting a metal plate adhered to the MD body by a magnet mounted on the turntable. A CD has no such a metal plate, and is mounted on a turntable by squeezing the top and bottom surfaces of it.

Both CD and MD have a position aligning hole at the center thereof. The hole of CD is larger than that of MD. The hole of CD is open at both ends, whereas the hole of MD is closed at its top end by the metal plate used for being attracted by a magnet.

As described above, although CD and MD have the same point that data reproduction is performed by a reflected laser spot, the disk shape and the disk holding mechanism are different. A conventional disk loading mechanism cannot load and eject both MD and CD. As a result, a reproducing apparatus for reproducing data by using the same disk motor and optical pickup has not been realized to date.

SUMMARY OF THE INVENTION

The present invention has been made in consideration of the above circumstances. It is an object of the present invention to provide an optical disk recording/reproducing apparatus capable of avoiding mutual interference between a CD loading mechanism and an MD loading mechanism for loading CD and MD and recording/reproducing data by the same optical pickup.

According to one aspect of the present invention, there is provided an optical disk recording/reproducing apparatus wherein: a disk motor is provided with a turntable having a movable ring driven by a spring or a magnetic force and a magnet for attracting an optical disk or a clamper: a clamper arm supports a clamper for squeezing a first optical disk between the clamper and the turntable, the first optical disk having no member to be attracted; a holder holds and lowers a second optical disk to load the second optical disk on the turntable at an optical disk loading position, the second optical disk having a member to be attracted and housed in a cartridge, and the holder being movable between an optical disk insertion position and the optical disk loading position; as the first optical disk is moved to the upper position of the turntable by a disk roller, the clamper arm is moved to clamp the first optical disk and the disk roller is retracted to a position not interfering with the first optical disk; and as the holder is moved to the optical disk loading position, the clamper and the clamper arm are held at the positions not interfering with the holder.

In the optical disk recording/reproducing apparatus, an insertion slot for inserting the second optical disk into the holder is formed at the position higher than an insertion slot for inserting the first optical disk into the apparatus and squeezing the first optical disk with the disk roller.

According to another aspect of the present invention, there is provided an optical disk recording/reproducing apparatus wherein: an optical pickup and a disk motor are supported by a floating chassis supported by a spring and a clamper, the floating chassis being fixed to, or floated relative to, a fixed chassis by a main slider supported by the floating chassis and allowed to freely slide on the floating chassis; the disk motor is provided with a turntable having a movable ring driven by a spring or a magnetic force and a magnet for attracting an optical disk or a clamper: a clamper arm supports a clamper for squeezing a first optical disk between the clamper and the turntable, the first optical disk having no member to be attracted; a pin mounted upright on the clamper arm is inserted in a bifurcated guide groove formed in the main slider and an L-character shaped groove formed in the floating chassis, and biased to be in contact with the outer edge of the bifurcated guide groove by a spring; a pin mounted upright on a holder for holding a second optical disk is inserted into the L-character shaped groove formed in the floating chassis and an oblique guide groove formed in a subsidiary slider supported by the floating chassis so as to be capable of sliding on the floating chassis, the second optical disk having a member to be attracted and housed in a cartridge, and as the subsidiary slider moves, the holder is moved between an optical disk insertion position and an optical disk loading position near at the turn table; as the first optical disk is moved to the upper position of the turntable by a disk roller and as the main slider moves to make the floating chassis enter a floating state, the clamper arm is moved to clamp the first optical disk and the disk roller is retracted to a position not interfering with the first optical disk; and as the subsidiary slider moves the holder to the optical disk loading position, the subsidiary slider pushes the clamper arm, and as the main slider moves to make the floating chassis enter a floating state, the pin mounted upright on the clamper arm engages with a horizontal portion of the bifurcated guide groove so as not to lower the clamper arm.

In the optical disk recording/reproducing apparatus an eject slider is mounted on the holder, the eject slider being capable of sliding on the holder and being biased forward by a spring; a stopper arm is rotatably mounted on the holder and biased by a spring to press and contact a projection formed on the stopper arm to a cam mounted on the eject slider; a release lever is rotatably mounted on a member supporting the holder and biased by a spring to press and contact the release lever to a stopper formed on the member supporting the holder; a projection extending to a passage of the stopper arm is formed on the release lever; as the cartridge of the second optical disk is inserted into the holder, the cartridge pushes a cartridge contact portion of the eject slider to move the eject slider backward and to make the cam of the eject slider push the projection of the stopper arm to rotate the stopper arm and engage an projection of the cam with the back of the projection of the stopper arm for the regulation of the forward motion of the eject slider; as the holder is moved thereafter to the optical disk loading position, the stopper arm rotates the release lever against the resilient force of the spring to allow the stopper arm to pass through an interference zone covered by the projection of the release lever; and as the holder returns from the optical disk loading position to the optical disk insertion position, the projection of the release lever rotates the stopper arm to release the regulation of the forward motion of the eject slider and to make the eject slider to push the cartridge of the second optical disk out of the holder.

In the optical disk recording/reproducing apparatus a grip arm is rotatably supported by the eject slider and biased by a spring in the direction of making a projection of the grip arm enter a recess of the cartridge inserted into the holder; and as the eject slider moves to the most front position, the projection of the holder rotates the grip arm to release an engagement of the projection of the grip arm with the recess of the cartridge.

In the optical disk recording/reproducing apparatus of this invention, the loading mechanism for loading a CD is constituted by a disk roller and a turntable, and the loading mechanism for loading an MD is constituted by a holder for holding an MD cartridge and a drive mechanism.

The holder for holding an MD cartridge is moved forward and upward when a CD is loaded. The CD passes under the holder by means of the disk roller and is moved to the upper position of the turntable whereat the clamper arm is moved downward at the back of the holder to squeeze the CD between the clamper arm and the turntable.

The clamper arm is moved upward when an MD is loaded. The holder holding the optical disk cartridge passes under or in front of the clamper and the MD is attracted to the magnet on the turntable.

Although both CDs and MDs are placed on the same turntable, the movable ring is at a lower position when an MD is placed to thereby determine the height thereof, whereas the movable ring is at a higher position when a CD is placed and the clamper determines the height thereof. In this manner, the record surfaces of both CDs and MDs can be set to the same height so that recording/reproducing is possible by using the same optical pickup.

In the optical disk recording/reproducing apparatus in which an optical pickup and a disk motor are supported by the floating chassis supported by springs and clampers, the clamper arm is moved upward and downward by the main slider which makes the floating chassis enter either in the floating state or the fixed state. When an MD is loaded, the clamper arm is moved backward by the holder, and pins mounted upright on the clamper arm engage with the horizontal portions of the bifurcated grooves when the main slider moves so that the clamper arm does not move downward.

When a CD is loaded, the clamper arm is being biased by the spring, and pins formed upright on the clamper arm engage with the slanted portions of the bifurcated grooves when the main slider moves so that the clamper arm lowers to make the clamper squeeze the CD. In this manner, both CDs and MDs can be loaded without interference of the clamper with the holder for loading an MD.

BRIEF DESCRIPTION OF THE DRAWINGS

FIG. 6A is a plan view of the holder of the optical disk recording/reproducing apparatus shown in FIG. 1, and FIG. 6B is a side view of the holder.

FIG. 10A is a plan view of MD whose data is reproduced by the optical disk recording/reproducing apparatus, FIG. 10B is a back view of the MD, FIG. 10C is a side view of the MD, and FIG. 10D is a cross sectional view of the MD.

FIG. 11 is an enlarged cross sectional view showing the central portion of the MD.

FIG. 12A is a plan view of the optical disk recording/reproducing apparatus in an MD loading state, and FIG. 12B is a side view of the optical disk recording/reproducing apparatus in the MD loading state.

FIG. 13A is a plan view of the holder of the optical disk recording/reproducing apparatus in the MD loading; state, and FIG. 13B is a side view of the holder of the optical disk recording/reproducing apparatus in the MD loading state.

FIG. 14A is a plan view of the holder in another MD loading state, and FIG. 14B is a side view of the holder in the other MD loading state.

FIG. 15A is a plan view of the holder in still another MD loading state, and FIG. 15B is a side view of holder in the other MD loading state.

FIG. 19A is a plan view of the optical disk recording/reproducing apparatus in another MD loading state, and FIG. 19B is a side view of the optical disk recording/reproducing apparatus in the other MD loading state.

FIG. 21A is a plan view of the optical disk recording/ reproducing apparatus in an MD unloading state, and FIG. 21B is an enlarged view of FIG. 21A.

Figure 22B:
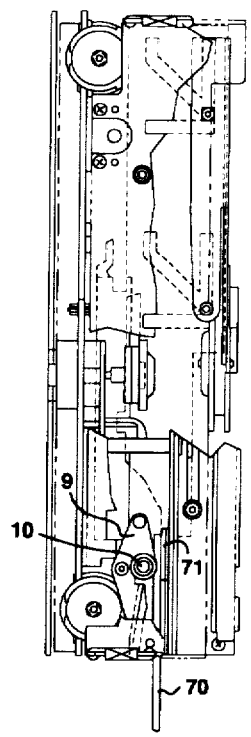
Figure 22A:
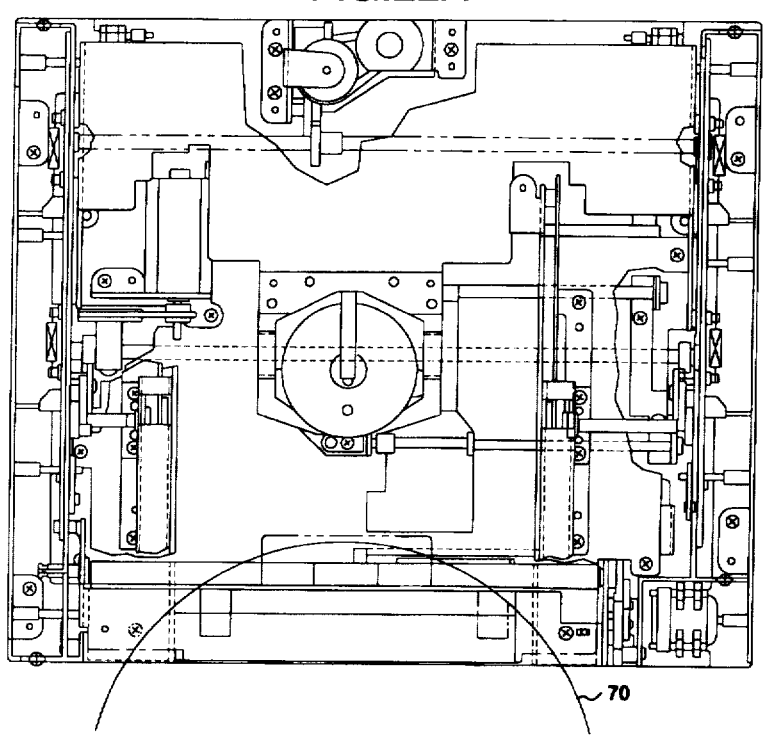

FIG. 22A is a plan view of the optical disk recording/ reproducing apparatus in a CD loading state, and FIG. 22B is a side view of the optical disk recording/reproducing apparatus in the CD loading state.

Figure 23A:
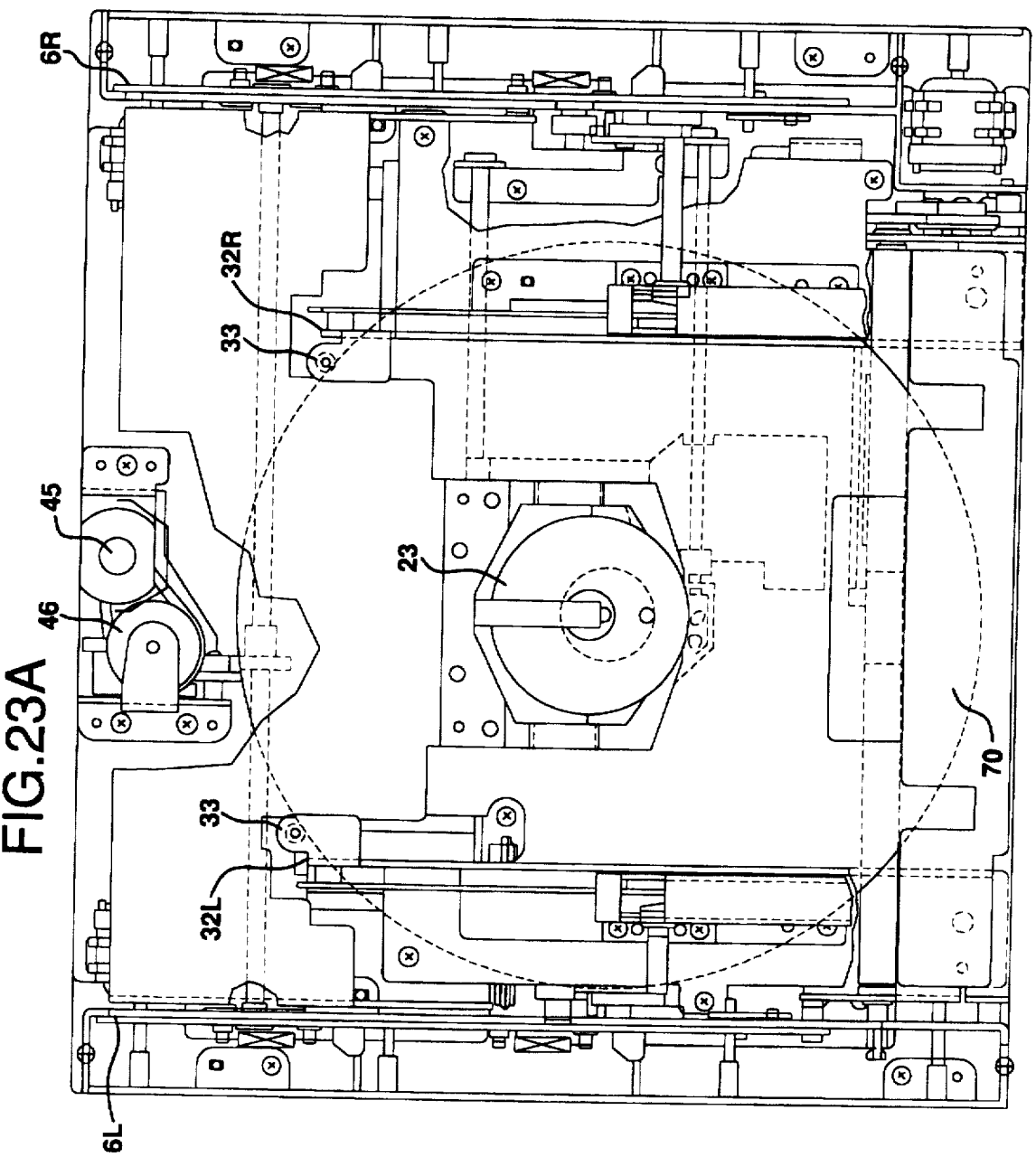
Figure 23B:
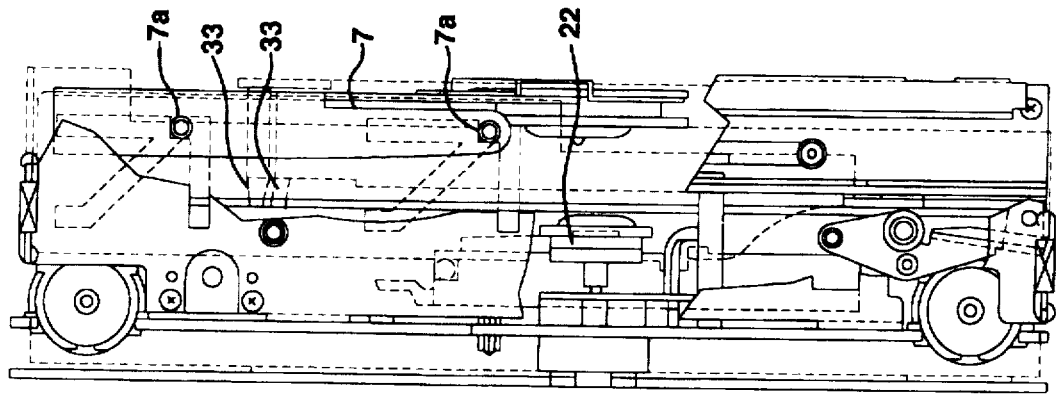

FIG. 23A is a plan view of the optical disk recording/ reproducing apparatus in another CD loading state, and FIG. 23B is a side view of the optical disk recording/reproducing apparatus in the other CD loading state.

Figure 24A:
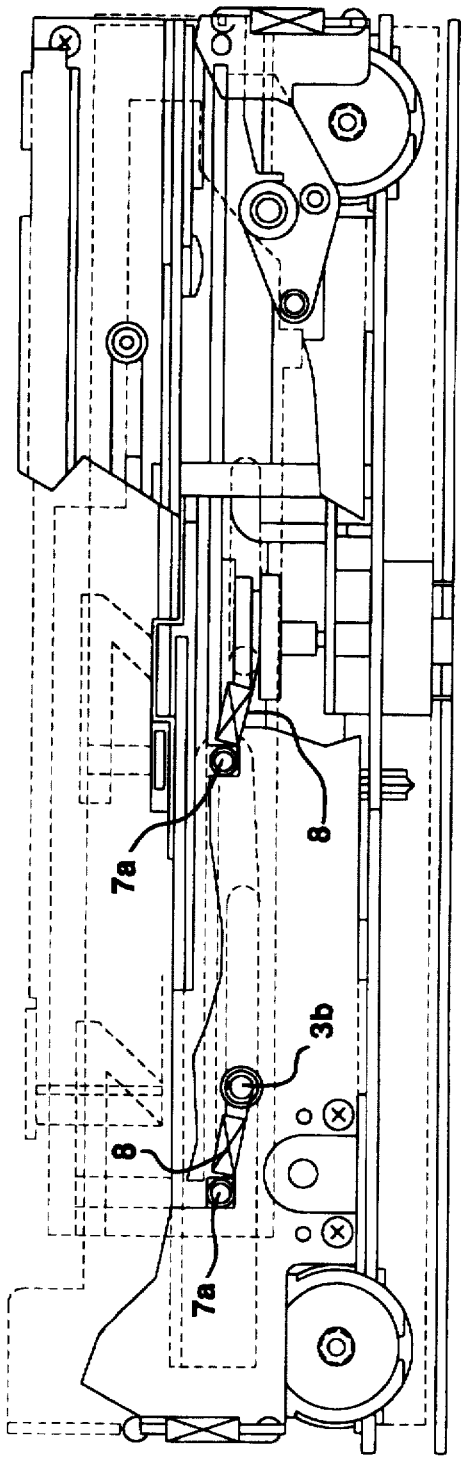
Figure 24C:
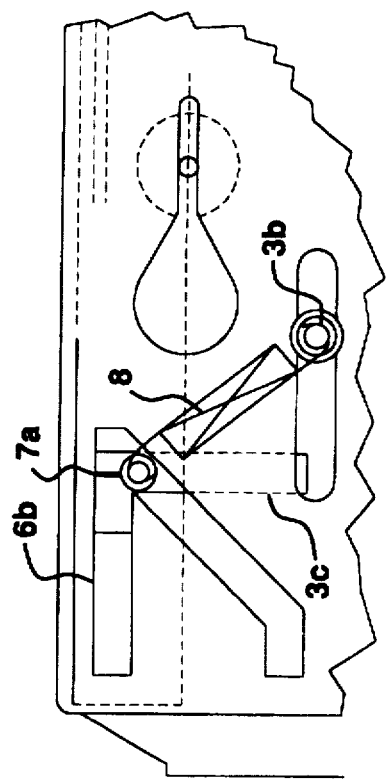
Figure 24B:
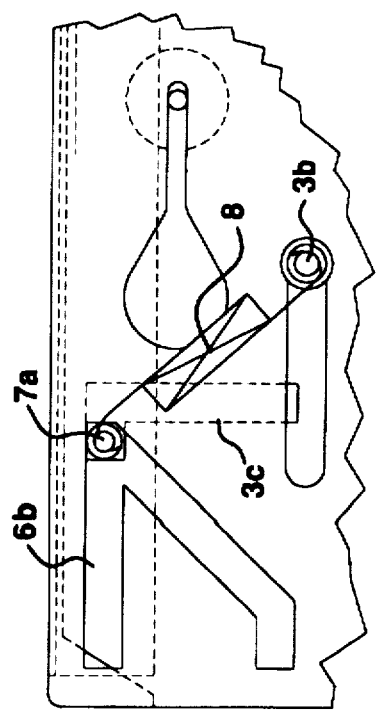

FIG. 24A is a side view of the optical disk recording/ reproducing apparatus in a CD loading completion state, FIG. 24B is a partial side view of the optical disk recording/ reproducing apparatus in the CD loading complete state immediately before the start of a main slider motion, and FIG. 24C is a partial side view of the optical disk recording/ reproducing apparatus in the CD loading complete state in the midst of the main slider motion.

DETAILED DESCRIPTION OF THE PREFERRED EMBODIMENTS

Figure 1:
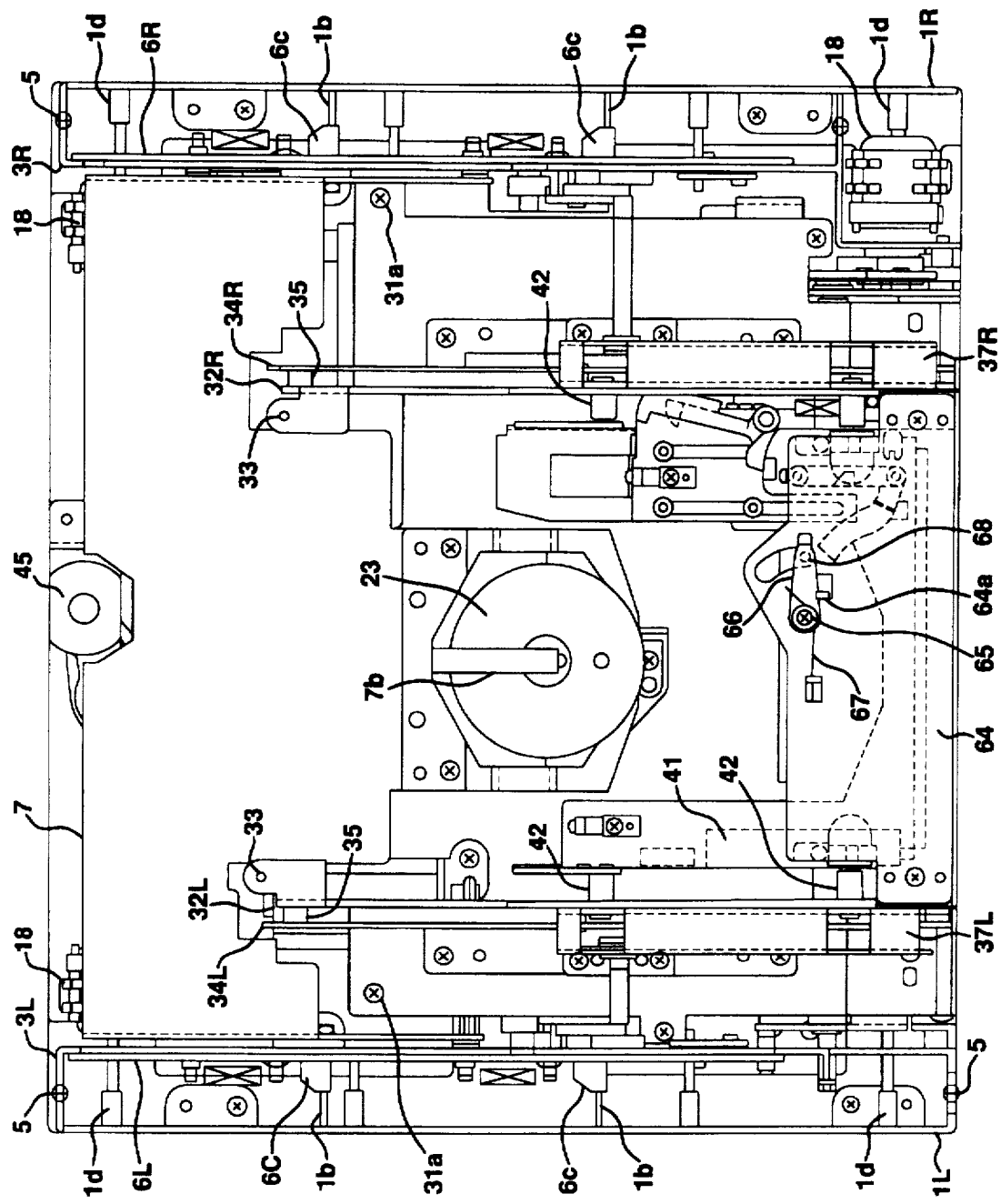
FIG. 1 is a plan view of an optical disk recording/reproducing apparatus according to an embodiment of the present invention.
Figure 3:
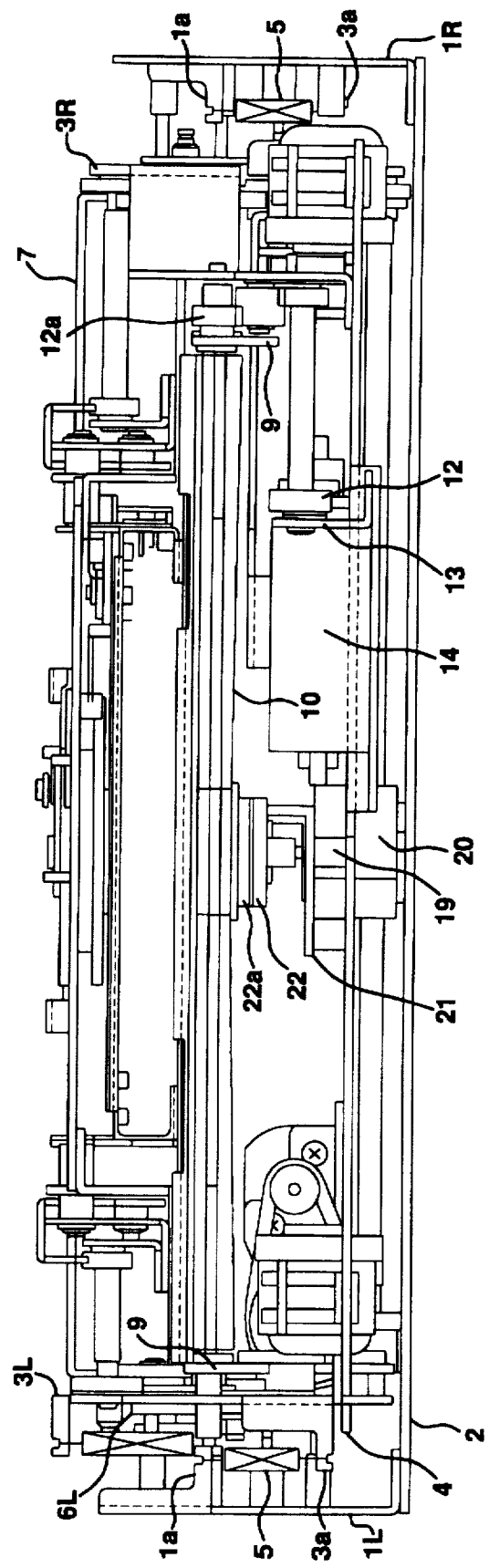
FIG. 3 is a front view of the optical disk recording/reproducing apparatus shown in FIG. 1.

An embodiment of this invention will be described with reference to the accompanying drawings. As shown in FIGS.1 and 3, side plates 1L and 1R are mounted on a bottom plate 2, and main side plates 3L and 3R are mounted on a main bottom plate 4. Springs 5, 5, . . . are extended between hooks 1a, 1a, . . . formed on the side plates 1L and 1R and hooks 3a, 3b, . . . formed on the main side plates 3L and 3R to suspend the main side plates 3L and 3R.

On the main bottom plate 4, vibration absorbing clampers 18, 18, . . . are mounted in which shafts 1d, 1d, . . . mounted on the side plates 1L and 1R are fitted. The side plates 1L and 1R and the bottom plate 2 constitute a fixed chassis, whereas the main side plates 3L and 3R and the main bottom plate 4 constitute a floating chassis supported by the fixed chassis in a floating state.

Main sliders 6L and 6R are disposed to the outside of the main side plates 3L and 3R. As shown in detail in FIG. 4, shafts 3b, 3b, . . . mounted upright on the main side plate 3L are inserted into prolong holes 6a and 6a formed in the main slider 6L (the same structure is provided also for the main slider 6R) to thereby support the main sliders 6L and 6R so as to be movable forward and backward.

A rack 6f is formed on the main slider 6L (the same structure is provided also for the main slider 6R. Hereinafter, one of the main sliders 6L and 6R will be described). The main sliders 6L and 6R are synchronously moved forward and backward by a motor 45 and a gear train 46.

Figure 4:
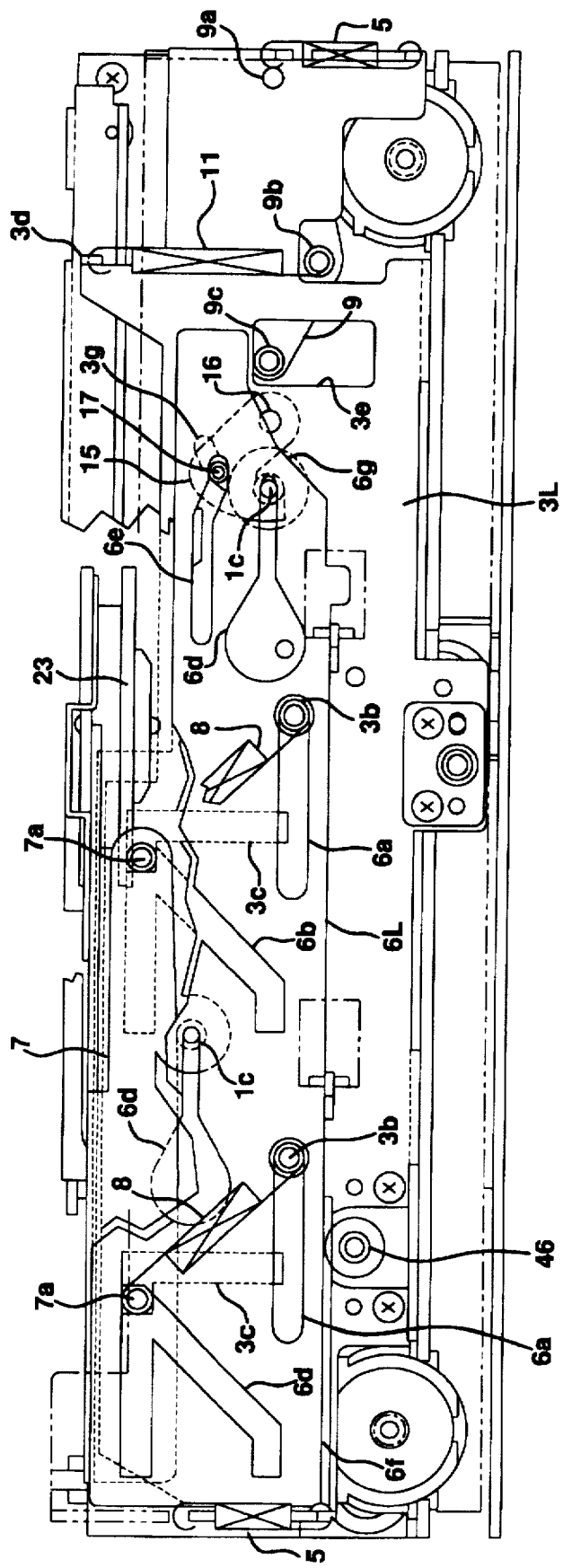
FIG. 4 is a partial side view of the optical disk recording/reproducing apparatus shown in FIG. 1.

A clamper arm 7 is disposed to the inside of the main side walls 3L and 3R. As shown in FIG. 4, shaft 7a and 7a formed upright on the clamper arm 7 are inserted into an L-character shaped prolong hole 3c formed in main side plate 3L and a bifurcated prolong hole 6b formed in the main slider 6L.

Springs 8 are extended between the shafts 7a and 7a formed upright on the clamper arm 7 and the shafts 3b 3b formed upright on the main side plates 3L and 3R to bias the clamper arm 7 in the obliquely downward and forward direction.

Figure 2:
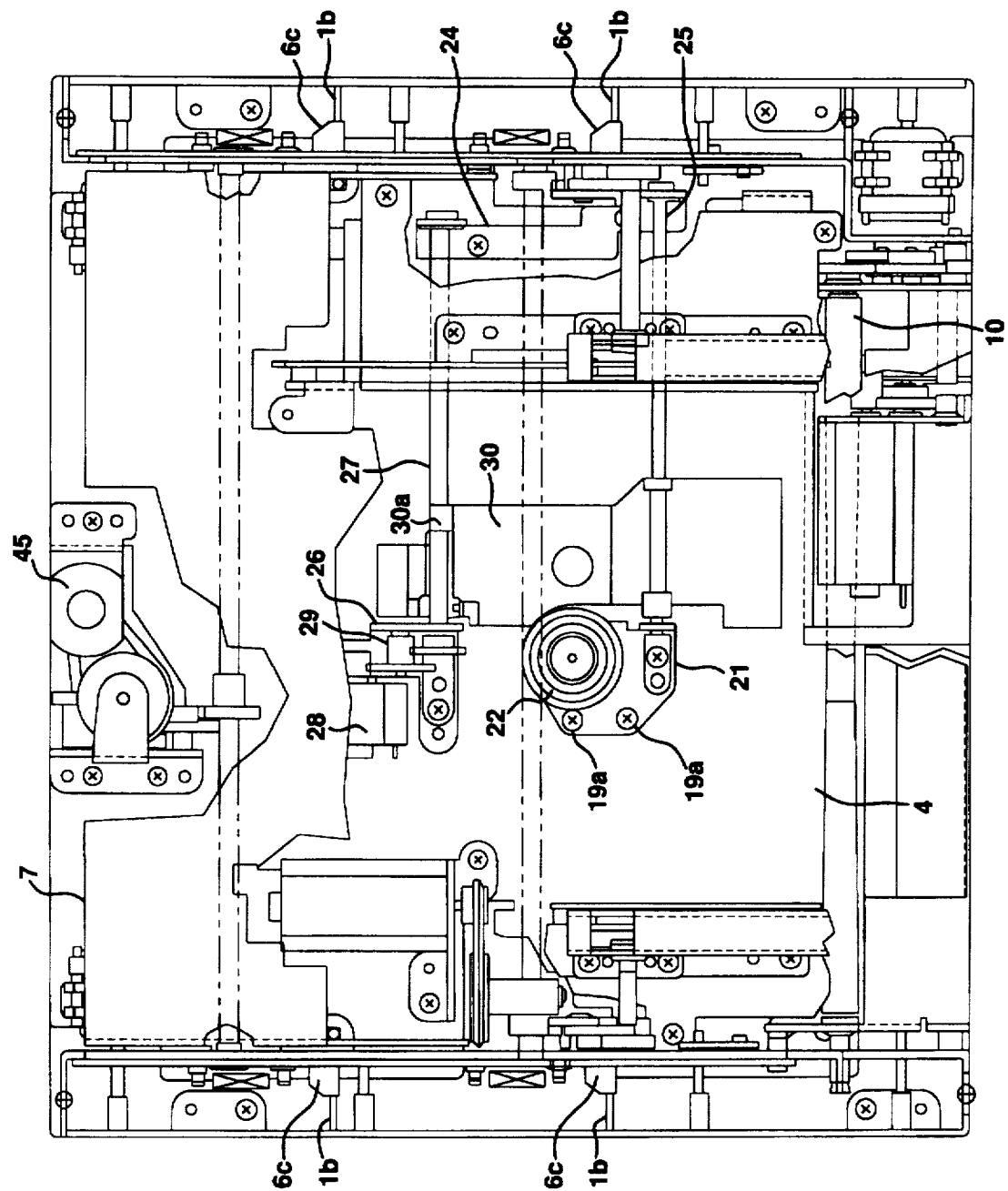
FIG. 2 is a partial plan view of the optical disk recording/reproducing apparatus shown in FIG. 1.
Figure 5:
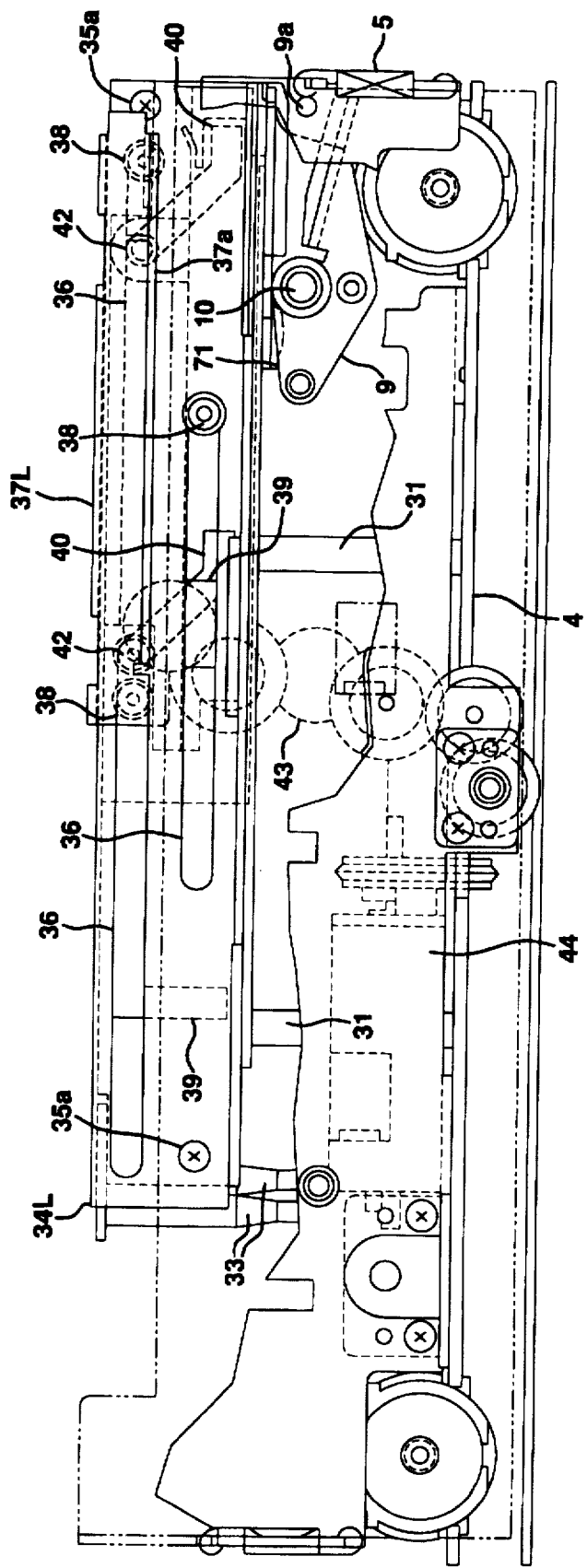
FIG. 5 is another partial side view of the optical disk recording/reproducing apparatus shown in FIG. 1.

As shown in FIGS.4 and 5, a roller arm 9 is disposed between the main side plates, the roller arm 9 being rotatable about a shaft 9a as a fulcrum. A disk roller 10 is mounted rotatably on the roller arm 9. The length of the disk roller 10 shown in FIG. 2 is greater than the diameter of a CD.

As shown in FIG. 4, a spring 11 is extended between the shaft 9b formed upright on the roller arm 9 and a hook 3d formed on the main side plate 3L so that the roller arm 9 is biased in the clockwise direction as viewed in FIG. 4. A shaft 9c formed upright on the roller arm 9 is inserted into a hole 3e formed in the main side plate 3L to regulate the rotation range of the roller arm 9. As shown in FIG. 3, the rotation force of a motor 14 mounted on a motor bracket 13 is transmitted via a gear 12 mounted on the motor bracket 13 and a gear 12a mounted on the roller arm 9, to a disk roller 10 supported by the roller arm 9.

As shown in FIG. 5, a disk guide 71 is disposed above the disk roller 10. A CD is squeezed by the desk guide 71 and the disk roller 10 to hold it horizontally.

As shown in FIG. 4, a cam 6g is mounted at the front end of the main slider 6L. As the main slider 6L moves forward from the rear position, the shaft 9c formed upright on the roller arm 9 abuts on the cam 6g, and the roller arm 9 is pushed downward against the resilient force of the spring 11.

As shown in FIGS.1 and 2, trapezoidal projections 6c and 6c are formed on the main sliders 6L and 6R, the projections 6c and 6c extending outside of the main sliders 6L and 6R. As the main sliders 6L and 6R move backward, the projections 6c and 6c abut on projections 1b and 1b formed on the side plates 1L and 1R to regulate the right and left positions of the main side plates 3L and 3R.

As shown in FIG. 4, shafts 1c and 1c formed upright on the side plates 1L are inserted into prolong holes 6d and 6d having a large diameter portion formed in the main slider 6L. A lock arm 15 is rotatably supported by a shaft 16 formed upright on the main side plate 3L. A shaft 17 formed upright on the lock arm 15 is inserted into a prolong hole 3g formed in the main side plate 3L and a prolong hole 6e formed in the main slider 6L.

As the main slider 6L moves most backward (to the position shown in FIG. 4), the lock arm 15 moves in the counter clockwise direction following the shape of the prolong hole 6e to lock the shaft 1c formed upright on the side plate 1L to thereby regulate the backward/forward position of the main side plate 3L. The engagement of the prolong hole 6d with the shaft 1c regulates the upward/ downward position of the main slider 6L.

In this case, as described earlier, the right/left position of the main sliders 6L and 6R is also regulated so that the floating chassis supporting the main sliders 6L and 6R enters a fixed state. Conversely, as the main sliders 6L and 6R move most forward, the floating chassis enters the floating state.

As shown in FIGS.2 and 3, a bracket 21 fixedly mounting a disk motor 20 is mounted on the main bottom plate 4 by means of a column 19 formed on the main bottom plate 4 and a screw 19a. A turntable 22 is mounted on the rotary shaft of the disk motor 20.

The turntable 22 used in this embodiment is described in Japanese Patent applications Nos. 5-167520 and 5-287792. The turntable 22 has a magnet and a moving ring 22a, and supports a CD or an MD while setting the record surface thereof to the same height.

As shown in FIGS.1 and 4, a clamper 23 for clamping a CD is mounted on the clamper arm 7. As the clamper 23 is attracted to the turntable 22, the clamper 23 is biased downward by a plate spring 7b coupled to the clamper arm 7, so that the turntable 22 and the clamper 23 rotate in unison.

As shown in FIG. 2, on the main bottom plate 4, an optical pickup mounting bracket 24 and a thread driven gear racket 26 are mounted. A pickup mounting shaft 25 is fixed horizontally between the disk motor bracket 21 and the optical pickup mounting bracket 24.

A feed screw 27 is mounted between the thread driven gear bracket 26 and the optical pickup mounting bracket 24 in parallel with the pickup mounting shaft 25. The feed screw 27 is rotated by a motor 28 and a gear train 29.

An optical pickup 30 is mounted on the pickup mounting shaft 25 and the feed screw 27. A screw engaging portion 30a of the optical pickup 30 engages with the feed screw 27 so that as the feed screw 27 rotates, the optical pickup 30 is fed along the pickup mounting shaft 25.

As shown in FIGS.1 and 5, columns 31 and 31 are mounted on the main bottom plate 4. Subsidiary side plates 32L and 32R are mounted by the columns 31 and screws 31a. The main parts of the subsidiary side plates 32L and 32R are bent in an L-character shape, providing the parallel planes with the main side plates 3L and 3R.

Position aligning pins 33 and 33 are mounted at the back of the subsidiary side plates 32L and 32R to align the positions of a CD transported by the disk roller 10. Rails 34L and 34R in parallel with the subsidiary side plates 32L and 32R are mounted by columns 35 and screws 35a at the outside of the subsidiary side plates 32T and 32R.

Prolong holes 36, 36, . . . are formed in the rails 34L and 34R so as to support and slide channel-shaped subsidiary sliders 37L and 37R. Specifically, shafts 38, 38, . . . formed upright on the subsidiary sliders 37L and 37R are inserted into the prolong holes 36, 36, . . .

Obliquely extending prolong holes 40 and 40 are formed in the subsidiary sliders 37L and 37R, whereas L-character shaped prolong holes 39 and 39 are formed in the subsidiary side plates 32L and 32R. Racks 37a are mounted on the subsidiary sliders 37L and 37R so that the subsidiary sliders 37L and 37R are synchronously moved forward and backward by a gear train 43 and a motor 44.

As shown in FIG. 1, a holder 41 for holding an MD cartridge is disposed between the subsidiary side plates 32L and 32R. Shafts 42, 42, . . . formed upright on the holder 41 are inserted into the obliquely extending prolong holes 40 and 40 of the subsidiary sliders 37L and 37R and the L-character shaped prolong holes 39 and 39 of the subsidiary side plates 32L and 32R. Therefore, as the subsidiary sliders 37L and 37R move forward and backward, the holder 41 is moved along the L-character shaped prolong holes 39 and 39.

As shown in FIG. 5, shafts 47, 47, . . . formed upright on the top of the holder 41 engage with prolong holes 48a and 48a formed in an eject slider 48 which is supported by the holder 41 so as to be forward and backward movable.

A spring 49 is extended between a hook 48b formed on the eject slider 48 and a hook 49 formed on the holder 41 to bias the eject slider 48 forward.

A grip arm 51 is rotatably supported by a shaft mounted on the eject slider 48. A spring 53 is extended between the hook 48g formed on the eject slider 48 and a hook 51a formed on the grip arm 51 to bias the grip arm 51 in the counter clockwise direction as viewed in FIG. 6A.

The grip arm 51 is formed with a projection 51b which fits in a recess 69a formed in the side wall of an MD cartridge 69 such as shown in FIG. 10. A stopper arm 54 is rotatably supported on a shaft 55 formed on the top of the holder 41. The stopper arm 54 is biased in the counter clockwise direction by a spring 56 so that a roller 57 mounted on the stopper arm 54 is pushed against a cam 48c mounted on the eject slider 48.

On moving the eject slider 48 from the most front position to the most back position, the stopper arm 54 rotates in the clockwise direction along a slanted surface formed on the cam to allow the eject slider 48 to move to the most back position.

However, on moving the eject slider 48 from the most back position to the most front position, a projection 48e formed on the cam 48c abuts on the roller 57 mounted on the stopper arm 54, so that the eject slider 48 cannot move further from a predetermined position.

When the eject slider 48 is at the most front position, the grip arm 51 has abutted on a projection 41a formed on the holder 41 and has been rotated in the clockwise direction against the resilient force of the spring 53.

A prolong hole formed in a shutter opener 58 engages with a shaft 59 formed upright on the left side plane of the holder 41. The shutter opener 58 is mounted on the holder 41 to be forward and backward movable. One end of a spring 56 biasing the stopper arm 54 is coupled to a hook 58a formed on the shutter opener 58 to bias the shutter opener 58 forward.

Figure 7:
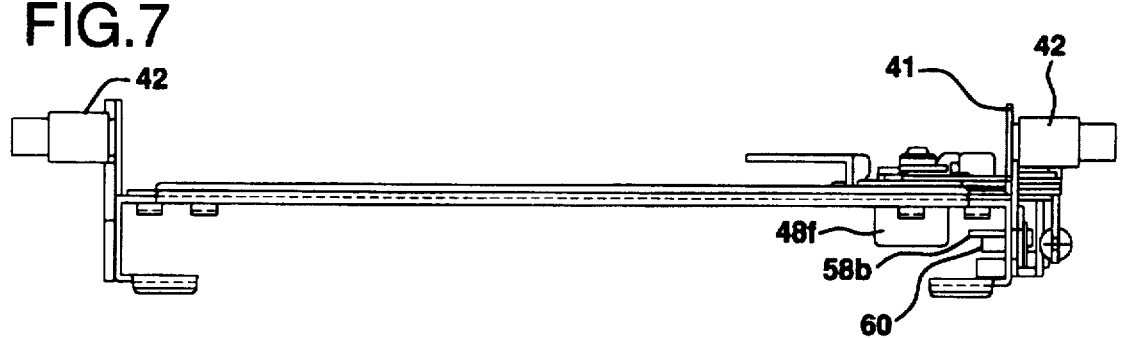
FIG. 7 is a front view of the holder of the optical disk recording/reproducing apparatus.

As shown in FIGS.6 and 7, a claw 58b is formed on the shutter opener at the inside thereof, the claw 58b abutting on a shutter 69b of an MD cartridge 69 housed in the holder 41. A plate spring 60 is also mounted on the shutter opener 58, the plate spring 60 being fitted in a hole 69d formed in the shutter 69b of the MD cartridge 69.

Plate springs 61 and 62 are mounted on the holder 41 and the eject slider 48, the plate springs 61 and 62 biasing an MD cartridge downward. As shown in FIGS.6 and 7, a cartridge contact portion 48f is formed on the eject slider 48. When an MD cartridge is housed in the holder 41, the cartridge contact portion 48f contacts the MD cartridge so that the MD cartridge moves together with the eject slider 48.

A switch 63 is mounted on the top of the holder 41. The switch 63 is operated by a switch contact portion 48h formed at the rear end of the eject slider 48 when the eject slider 48 is at the most back position.

As shown in FIG. 1, a coupling plate 64 is mounted between the subsidiary side plates 32L and 32R. A release lever 66 is rotatably mounted on a shaft 65 formed on the coupling plate 64, the release lever 66 being biased in the clockwise direction by a spring 67. A projection formed on the coupling plate 64 regulates the release lever 66 so as not to rotate it more than a predetermined angle.

A lever contact portion 68 is formed at the front end of the release lever 66, extending downwards. The lever contact portion 68 contacts the stopper arm 54 when the holder 41 moves backward from the most front position or forward from the most back position along the L-character shaped prolong holes formed in the subsidiary side plates 32L and 32R.

Next, the MD cartridge loading and ejecting operations of the optical disk recording/reproducing apparatus constructed as above will be described with reference to FIGS.12 to 21. The initial state is assumed to be a state wherein the subsidiary sliders 37L and 37R are at the most front position and the main sliders 6L and 6R are at the most back position, as shown in FIG. 1 to 4.

As shown in FIGS.12 and 13, when the MD cartridge 69 is inserted horizontally into the holder 41 at the initial state, the cartridge contact portion 48f formed on the eject slider 48 contacts the cartridge 69.

As the MD cartridge 69 is pushed backward from the state shown in FIGS.12 and 13, the eject slider 48 moves backward together with the MD cartridge, against the resilient force of the spring 49. Then, the claw 58b formed on the shutter opener 58 abuts on the shutter 69b of the MD cartridge 69 to open it.

The plate spring 60 coupled to the shutter opener 58 fits in the hole 69d of the shutter 69b. As shown in FIG. 14, the roller 57 of the stopper arm 54 in contact with the cam 48c of the eject slider 48 moves along the slanted surface 48d of the cam 48c and abuts on the projection 48e.

At this state, since the eject slider 48 has moved backward, the projection 441a formed on the holder 41 detaches from the grip arm 51 which in turn rotates in the counter clockwise direction so that the projection 51b of the grip arm 51 engages with the recess 69a of the MD cartridge. The plate springs 61 and 62 coupled to the holder 41 and the eject slider 48 push the MD cartridge downward.

As shown in FIG. 15, as the MD cartridge 69 is further pushed backward, the shutter 69b together with the eject slider 48 and the cartridge 69 moves backward. Therefore, the shutter opener 58 in contact with the shutter moves backward against the resilient force of the spring 56, and the switch contact portion 48h of the eject slider 48 pushes the switch 63.

After the switch 63 is pushed and the MD cartridge 69 is stopped being pushed backward, the cartridge 69 moves forward by the resilient forces of the spring 49 biasing the eject slider 48 and the spring 56 biasing the shutter opener, and the roller 57 mounted on the stopper arm 54 abuts on the projection 48e of the cam mounted on the eject slider 48. Therefore, the eject slider 48 the cartridge 69 stop moving, and the shutter opener 58 resumes the state when it starts moving.

When an actuation of the switch 63 is detected by a microcomputer or the like, the motor 44 shown in FIG. 5 starts rotating to drive the subsidiary sliders 37L and 37R via the gear train 43. As the subsidiary sliders 37L and 37R move backward, the holder 41 moves first backward and then downward along the L-character shaped prolong holes 39 of the subsidiary side plates 32L and 32R.

Figure 16A:
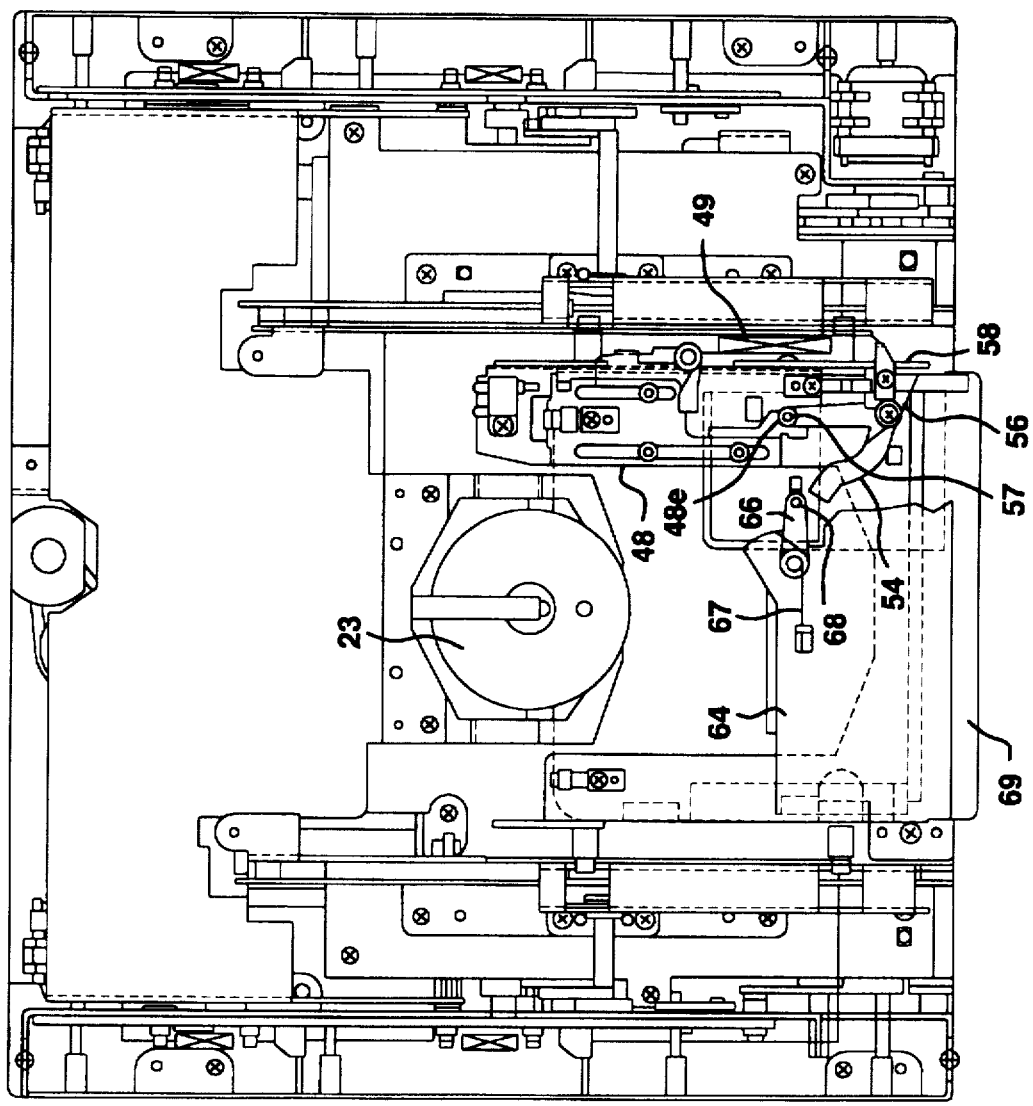
FIG. 16A is a plan view of the optical disk recording/reproducing apparatus in another MD loading state.
Figure 16B:
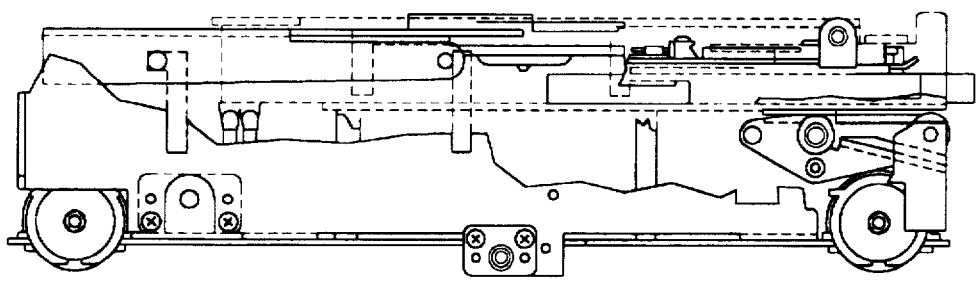
FIG. 16B is a side view of the optical disk recording/reproducing apparatus in the other MD loading state.
Figure 17B:
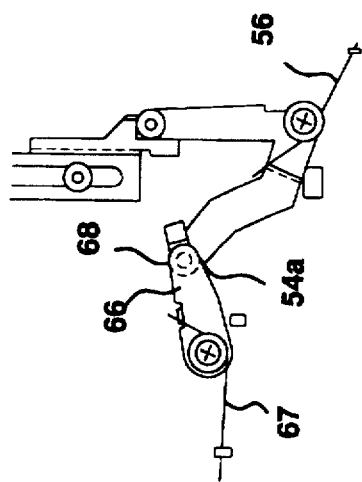
FIG. 17B is an enlarged view of FIG. 17A.
Figure 17A:
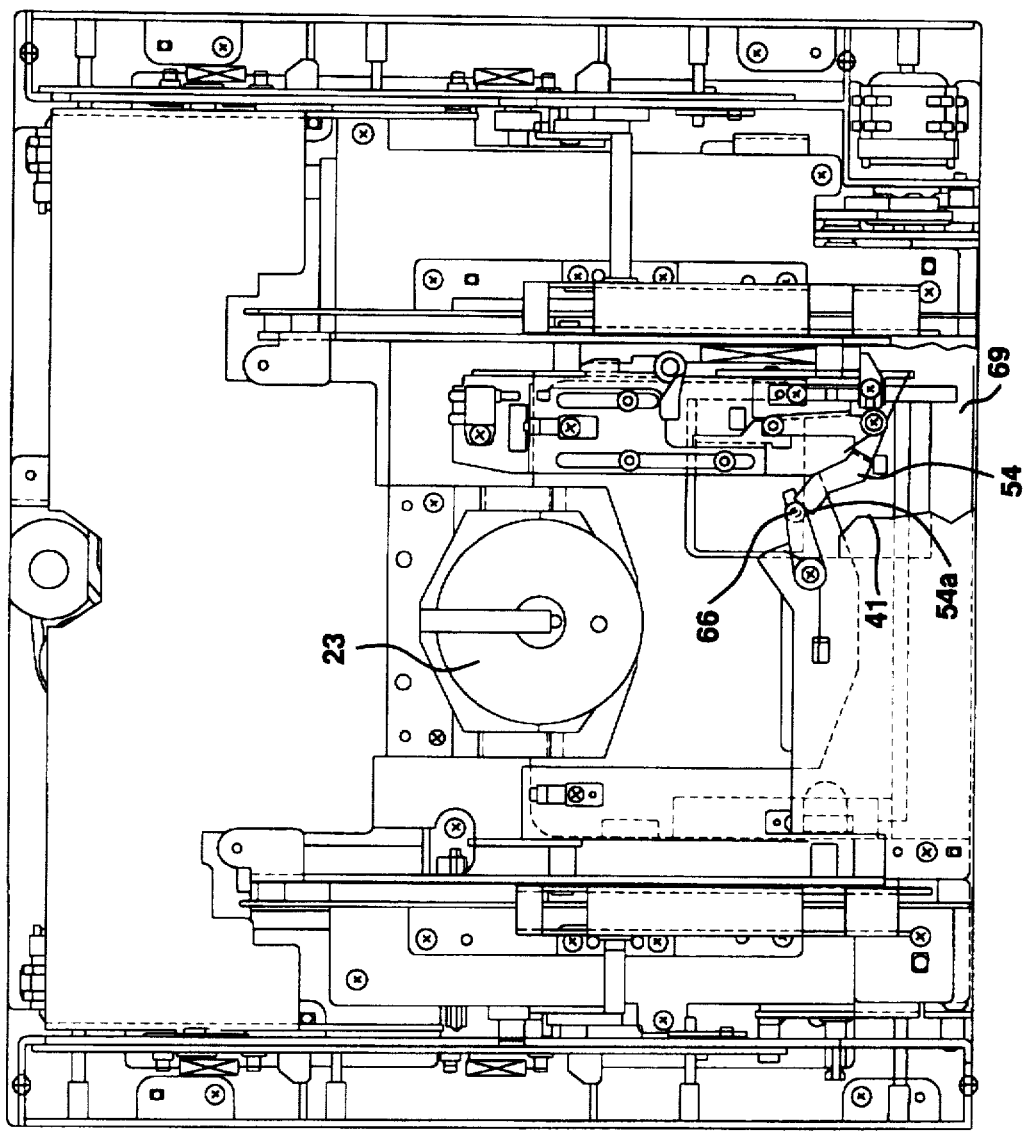
FIG. 17A is a plan view of the optical disk recording/reproducing apparatus in still another MD loading state.

FIGS. 16 and 17 illustrate the motion of the holder 41. As the holder 41 moves backward, the slanted surface 54a of the stopper arm 54 rotatably mounted on the holder 41 abuts on the lever contact portion of the release lever 66 rotatably mounted on the coupling plate 64, so that the release lever 66 rotates in the counter clockwise direction against the resilient force of the spring 67.

At this state, since the stopper arm 54 does not rotate, the states of the eject slider 48 and the MD cartridge 69 are maintained. Also at this state, the MD cartridge 69 passes under the clamper 23. As the holder 41 further moves backward along the L-character shaped prolong hole 39 of the holder 41, the release lever 66 detaches from the stopper arm 54 and is moved backward by the spring 67 until it abuts on the projection 64a formed on the coupling plate 64, as shown in FIG. 18.

Figure 18A:
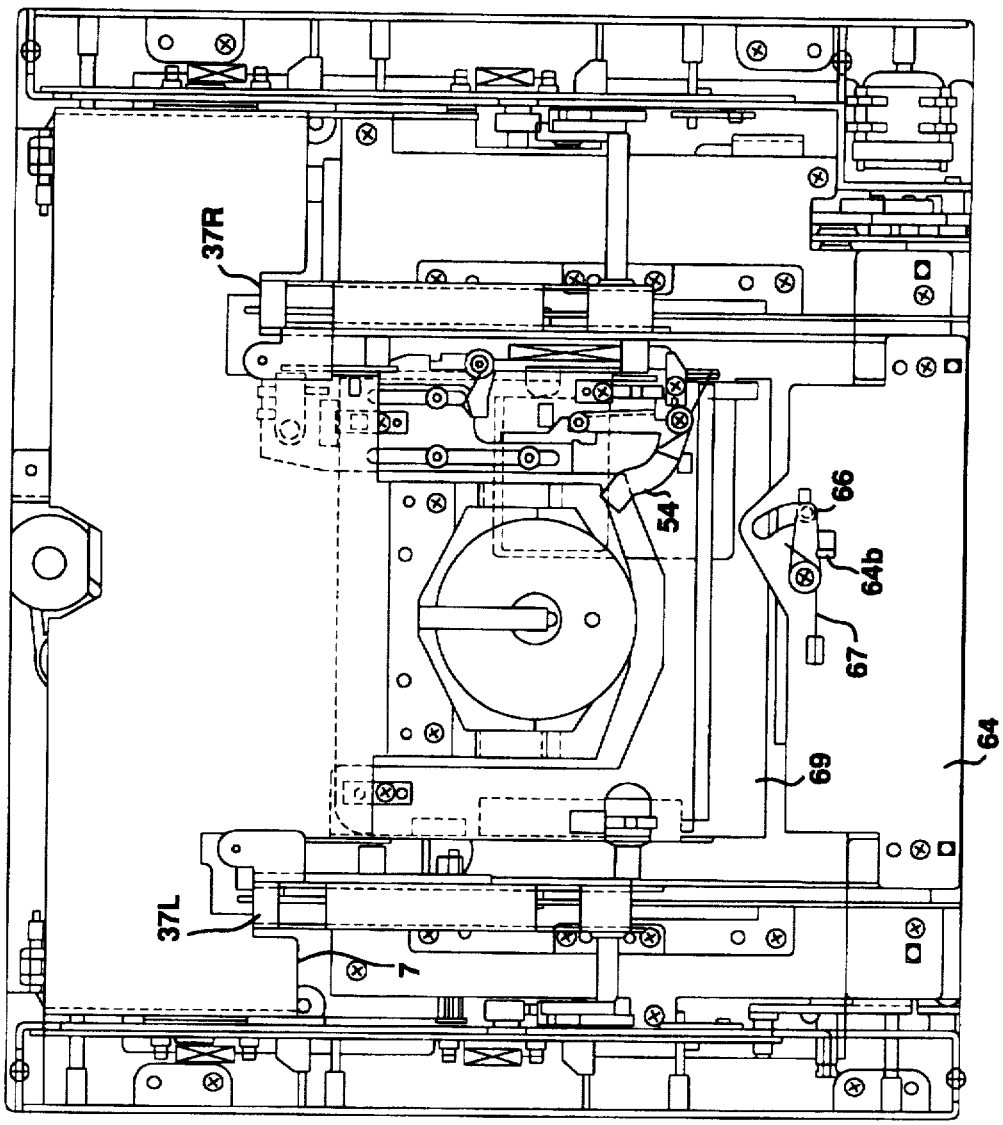
FIG. 18A is a plan view of the optical disk recording/reproducing apparatus in another MD loading state.
Figure 18B:
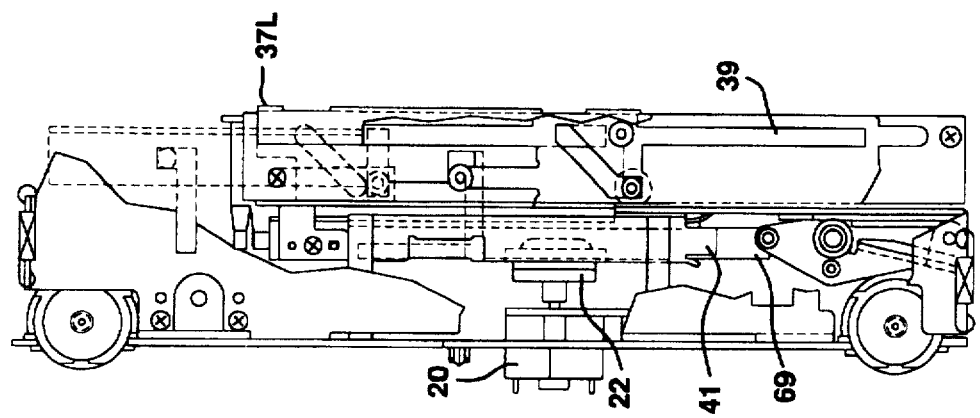
FIG. 18B is a side view of the optical disk recording/reproducing apparatus in the other MD loading state.

As the subsidiary sliders 37L and 37R move to the most back position, the holder 41 moves along the L-character shaped prolong hole 39 and the cartridge 69 housed in the holder 41 is loaded at a predetermined position, as shown in FIG. 18. The rear ends of the subsidiary sliders 37L and 37R abut on the clamper arm 7 to prevent the clamper arm 7 from moving forward. A magnetic metal plate 69d adhered to the MD 69c in the cartridge 69 shown in FIG. 11 is attracted by a magnet on the turn table 22 mounted on the disk motor 20.

When a completion of loading the cartridge 69 is detected by a switch or the like, the motor 44 stops and the subsidiary sliders 37L and 37R and the holder 41 stop moving in response to an instruction from the microcomputer or the like. At the same time, the motor 45 shown in FIGS.1 and 2 starts rotating to move the sliders 6L and 6R from the most back position to the most front position.

Figure 20A:
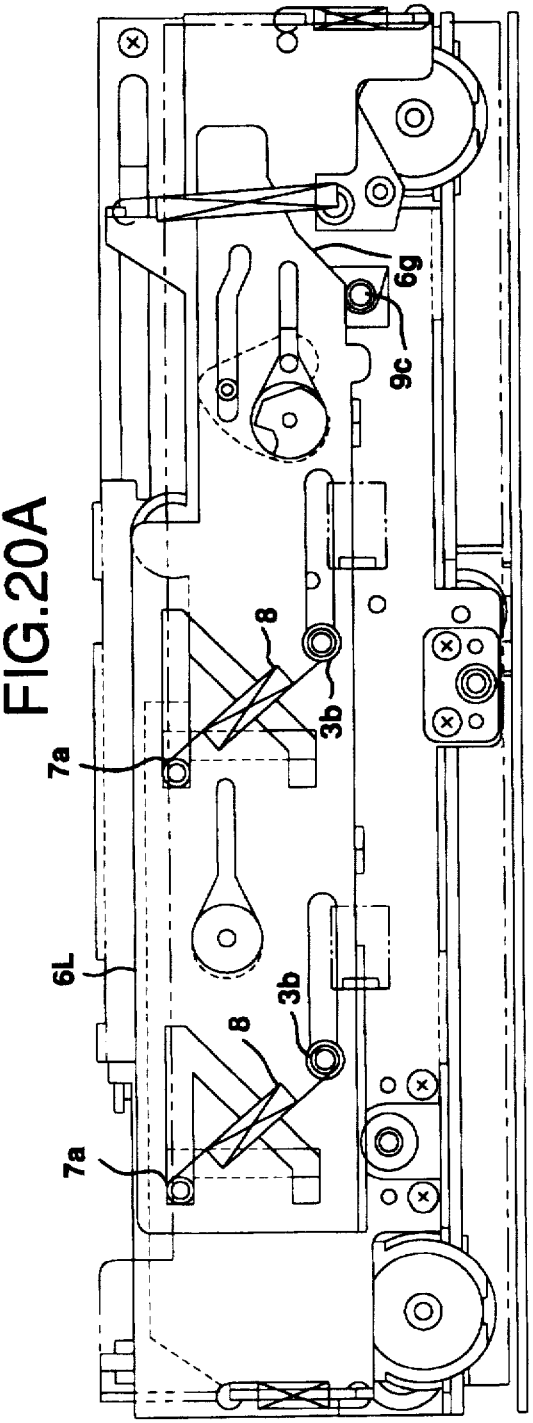
FIG. 20A is a side view of the optical disk recording/reproducing apparatus in an MD loading completion state.
Figure 20C:
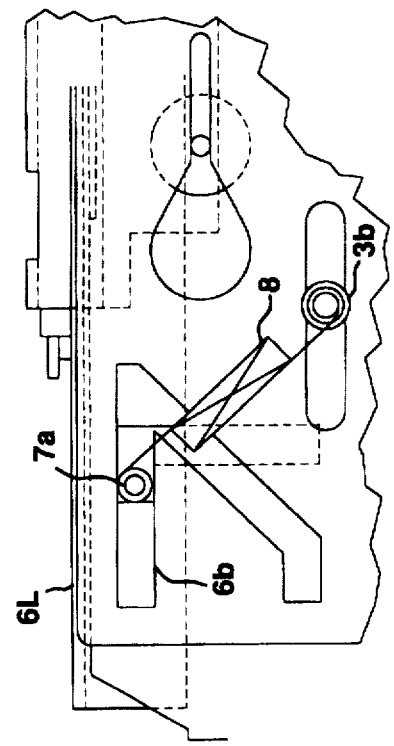
FIG. 20C is a partial side view of the optical disk recording/ reproducing apparatus in the MD loading complete state in the midst of the main slider motion.
Figure 20B:
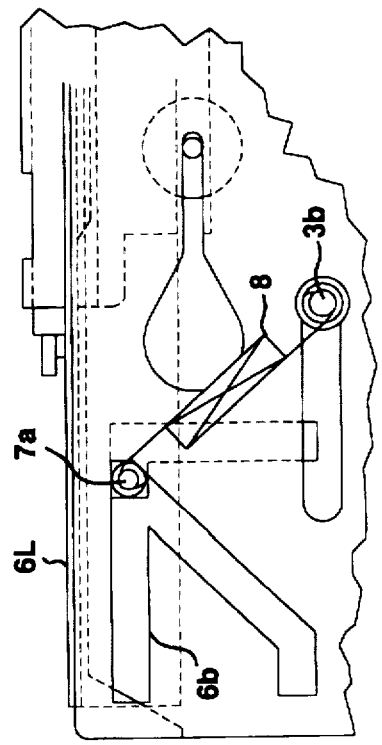
FIG. 20B is a partial side view of the optical disk recording/reproducing apparatus in the MD loading complete state immediately before the start of a main slider motion.

FIGS.19 and 20A illustrate a state of a completion of the motion of the subsidiary sliders 37L and 37R. FIG. 20B illustrates a state immediately before the motion, and FIG. 20C illustrates a state in the midst of the motion.

Although the clamper arm 7 is biased obliquely downward and forward by the springs 8 extended between the shafts 7a of the clamper arm 7 and the shafts 3b of the main side plates 3L and 3R, the clamper arm 7 does not change its position even if the main sliders 6L and 6R move because the clamper arm 7 is prevented from moving forward by the subsidiary sliders 37L and 37R.

Since the shafts 7a of the clamper arm 7 do not move as the main sliders 6L and 6R move forward, the shafts 7a engage with horizontal portions of the bifurcated prolongs holes 6b of the main sliders 6L and 6R. The cams 6g formed on the main sliders 6L and 6R abut on the shaft 9c formed upright on the roller arm 9 so that the roller arm 9 rotates in the counter clockwise direction as seen in FIGS.19 and 20.

Although the shafts 1c formed upright on the side plates 1L and 1R are inserted into the prolong holes 6d formed in the main sliders 6L and 6R, the main sliders 6L and 6R moving forward are released from the up/down motion regulation because the shaft 1c enters the large diameter portion of the prolong holes 6d.

At the same time, since the shaft 17 formed upright on the lock arm 15 moves along the prolong holes 6e of the main sliders 6L and 6R, the lock arm 15 rotates in the clockwise direction and detaches from the shafts 1c to release a forward/backward motion regulation of the main sliders 6L and 6R. The trapezoidal projections of the main sliders 6L and 6R detach from the projections 1b of the side plates 1L and 1R so that the right/left motion regulation of the main sliders 6L and 6R is released.

In the above manner, as the main sliders 6L and 6R move forward, the main sliders 6L and 6R and portions supported by them enter the floating state wherein only the springs 5 and clampers 18 support them. Since the portion of supporting the disk and recording/reproducing data enters the floating state, external vibrations do not affect the record/ reproduction operation of the apparatus and a loss or skip of sounds can be avoided.

When the motion of the main sliders 6L and 6R to the most front position is detected by a switch or the like, the motor 45 stops rotating and the main sliders 6L and 6R stop moving in response to an instruction from the microcomputer or the like. At this state, the disk motor 20 rotates the turntable 22 and the MD to record/reproduce data by the optical pickup 30.

After the completion of recording/reproducing, response to an instruction form the microcomputer or the like, the motor 45 rotates in the reverse direction opposite to when the MD cartridge is loaded, and the main sliders 6L and 6R are moved backward from the most front position.

By the reverse operations opposite to the loading operations, the forward/backward, right/left, and up/down motions of the main sliders 6L and 6R are regulated. The main side plates 3L and 3R and the main bottom, plate 4 supporting the main sliders 6L and 6R operate in a similar manner.

When the motion of the main sliders 6L and 6R to the most back position is detected by a switch or the like, in response to an instruction from the microcomputer or the like, the motor 45 stops rotation and the main sliders 6L and 6R stop moving.

Next, in response to an instruction from the microcomputer or the like, the motor 44 starts rotating to move the subsidiary sliders 37L and 37R forward opposite to the loading operation, and therefore the holder 41 is moved along the L-character prolong hole 39 in the direction opposite to the loading operation. As a result, the MD detaches from the turntable 22 and the subsidiary sliders 32L and 32R detach from the clamper arm 7.

As the holder 41 moves forward, the front end portion 54b of the stopper arm 54 abuts on the lever contact portion of the release lever 66 as shown in FIG. 21. Since the release lever 66 does not rotate more than a predetermined angle because of the projection 64a formed on the coupling plate 64, the stopper arm 54 is pushed by the lever contact portion 68 and rotated in the clockwise direction as the holder 41 further moves forward.

As the stopper arm 54 rotates in the clockwise direction, the roller 57 mounted on the stopper arm 54 detaches from the projection 48e of the cam 48e of the eject slider 48, so that the eject slider 48 is allowed to move forward. The eject slider 48 therefore moves forward by the resilient force of the spring 49.

The cartridge contact portion 48 of the eject slider 49 abuts on the MD and the projection 51b of the grip arm 51 engages with the recess of the cartridge. Therefore, as the eject slider 48 moves forward, the cartridge. 69 moves with the eject slider 48.

As the holder 41 further moves forward, the stopper arm 54 detaches from the lever contact portion of the release lever 66. Therefore, the eject slider 48 and the cartridge 69 take the positions of the initial state before the eject slider 48 moves. At this state, the grip arm 51 abuts on the projection 41a of the holder 41 so that the grip arm 51 rotates in the clockwise direction to enter the state shown in FIG. 6 and the projection 51b of the grip arm 51 detaches from the recess 69a of the cartridge. When the motion of the holder to the most front position is detected by a switch or the like, the motor 44 stops rotating in response to an instruction from the microcomputer or the like.

Next, the operations of loading and ejecting a CD by the optical disk recording/reproducing apparatus will be described with reference to FIGS.22 to 24.

Figure 8A:
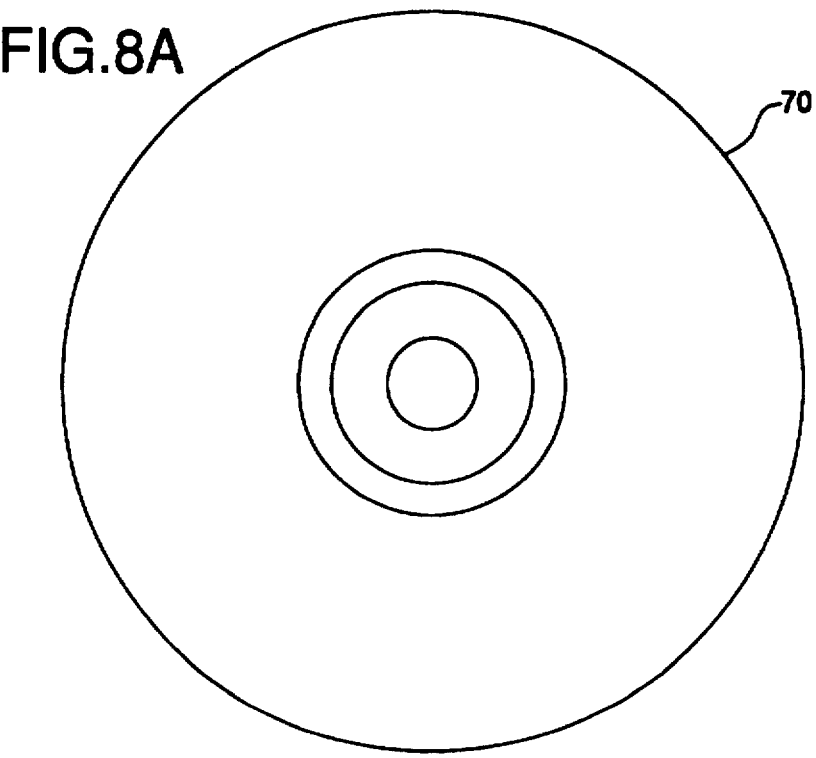
FIG. 8A is a plan view of CD whose data is reproduced by the optical disk recording/reproducing apparatus.
Figure 8B:
FIG. 8B is a cross sectional view of the CD.
Figure 9:
FIG. 9 is an enlarged cross sectional view showing the central portion of the CD.

A CD 70 shown in FIGS.8 and 9 is inserted between the disk guide 71 and the disk roller 10 at the initial state as shown in FIG. 22. As described earlier, the roller arm 10 supporting the disk roller 10 is biased upward by the spring so that the CD 70 is held between the disk roller 10 and the disk guide 71.

When the insertion and hold state of the CD 70 between the disk roller 10 and the disk guide 71 is detected by an optical sensor or the like, the motor 14 shown in FIG. 3 rotates in response to an instruction from the microcomputer or the like so that the disk roller is rotated via the gear train to move the CD 70 backward.

The CD 70 is moved backward until it abuts on the two position aligning pins 33 and 33 mounted on the subsidiary side plates 32L and 32R as shown in FIG. 23. When a contact of the CD 70 with the two position aligning pins 33 and 33 is detected by a switch or the like, the motor 14 stops rotating in response to an instruction from the microcomputer or the like.

Next, in response to an instruction from the microcomputer or the like, the motor 45 rotates to move the main sliders 6L and 6R via the gear train 46 from the most back position to the most front position. As the main sliders 6L and 6R are moved forward, the disk roller 10 is pushed downward so that the main sliders 6L and 6R, the main side plates 3L and 3R, the main bottom plate 4, and the like enter the floating state. This operation is the same as the loading operation of the MD cartridge.

In this case, however, the clamper arm 7 is moved downward and the disk roller 10 lowers. Therefore, the CD 70 lowered down on the turntable 22 is clamped by the clamper 23 and the turntable 22.

The state where the clamper arm 7 is lowered, is illustrated in FIGS.24A to 24C. The state where the motion of the subsidiary sliders 37L and 37R is completed, is illustrated in FIGS.24A. FIG. 24B illustrates the state immediately before the motion, and FIG. 24C illustrates the state in the midst of the motion. The clamper arm 7 is biased obliquely downward and forward by the springs 8 extended between the shaft 7a of the clamper arm 7 and the shafts 3b of the main side plates 3L and 3R, and tightly contacted with the front edges of the bifurcated prolong holes 6b of the subsidiary sliders 37L and 37R.

Accordingly, as the main sliders 6L and 6R move forward, the shafts 7a of the clamper arm 7 move first forward and then downward along the oblique portions the bifurcated prolong holes 6b and the L-character shaped prolong holes 3c of the main side plates 3L and 3R.

When the motion of the main sliders 6L and 6R to the most front position is detected by a switch or the like, the motor 45 stops rotating in response to an instruction from the microcomputer or the like, and loading the CD completed. The CD 70 is rotated by the turntable 22 and the clamper 23 for data reproduction.

After the data reproduction, in response to an instruction from the microcomputer or the like, the motor 45 starts rotating to move the main sliders 6L and 6R backward from the most front position. As a result, the main sliders 6L and 6R, the main side plates 3L and 3R, the main bottom plate 4, and the like enter the fixed state, and the disk roller 10 is pulled up and the clamper arm 7 is moved upward. Therefore, the CD 70 is squeezed between the disk guide 71 and the disk roller 10.

When the motion of the main sliders 6L and 6R to the most back position is detected by a switch or the like, the motor 14 starts rotating and the disk roller 10 moves the CD 70 forward, in response to an instruction from the microcomputer or the like. When the motion of the CD 70 squeezed by the disk guide 71 and the disk roller 10 to the most front position is detected by an optical sensor or the like, the motor 14 and the CD 70 are stopped in response to an instruction from the microcomputer or the like. The CD 70 is thereafter pulled out by a hand.

The structure of the embodiment of the invention is not limited to the foregoing description. For example, in loading an MD cartridge, instead of passing the MD cartridge under the clamper arm without moving the clamper arm, the clamper arm may be moved backward to retract it from the passage of the MD cartridge.

Specifically, the length of the horizontal portion of the L-character shaped prolong hole 3c guiding the clamper arm is elongated so that as the main sliders and 6L 6R are moved backward, the clamper arm is moved backward to reserve a space for passing the MD cartridge. In this manner, the height of the apparatus can be reduced, and the motion span of the clamper arm can be shortened to reduce the operation time thereof.

Only one type of a CD has been used in the above embodiment. Two types of CDs having different diameters may be used by using movable position aligning pins.

According to the present invention, recording/reproducing of both CDs and MDs is possible by using the same disk motor and optical pickup, so that the cost and space can be reduced as compared to independent two apparatuses for CDs and MDs.

What is claimed is:

1. An optical disk reproducing apparatus for reading both a first type of optical disk having a magnetic member located in a center portion thereof and housed in a cartridge, and a second type of optical disk which does not have a magnetic member and is not housed in a cartridge, comprising:

a single optical pickup for reproducing information recorded on an optical disk;

a disk rotation means provided with a movable ring driven by a spring or magnetic force, a magnet for attaching to the magnetic member of the first type of optical disk, and a single turntables, for rotationally driving an optical disk mounted thereon;

clamp means for elevatably moving a clamper between a first position where the clamper clamps the second type of optical disk to the turntable, and a second position above the turntable;

a first carrying means provided with a disk roller for moving the second type of optical disk between a loading position thereof and a position above the turntable without using a disk tray; and a second carrying means provided with a holder for holding the first type of optical disk, the holder being movable between a loading position of the first type of optical disk and a position above the turntable, wherein said second carrying means is disposed above said first carrying means, and said holder is disposed between the clamper and the turntable, an inner edge of said holder at the loading position of said first type of optical disk extends to cover at least part of said turntable, and said holder is provided with a notch so that when said second carrying means is positioned at the loading position of the first type of optical disk, the clamper is free to descend through the notch in clamping the second type of optical disk to the turntable.

2. The optical disk reproducing apparatus of claim 1, wherein said holder includes means for locking the clamper preventing it from descending when said second carrying means is moved to the position above the turntable.

3. The optical disk reproducing apparatus of claim 2, further comprising a floating chassis for mounting said optical pickup and a disk drive motor, and a fixed chassis for holding the floating chassis by means of a spring and clamper, wherein said holder includes a slide member slidably attached to the floating chassis to move between a first position and a second position, where said slide member fixes the floating chassis relative to the fixed chassis in said first position.

4. The optical disk reproducing apparatus of claim 1, wherein said movable ring adjusts focusing in the same position for both of the first and second types of optical disks.

5. An optical disk reproducing apparatus for reading both a first type of optical disk having a magnetic member located in a center portion thereof and housed in a cartridge, and a second type of optical disk which does not have a magnetic member and is not housed in a cartridge, comprising:

a single optical pickup for reproducing information recorded on either the first or second types of optical disk;

a disk rotation means for driving a single turntable to rotate one of said first and second type of optical disks, including a magnet for attaching to the magnetic member of the first type of optical disk, said single turntable mounted in a fixed location in the apparatus;

a first carrying means provided with a disk roller for moving the second type of optical disk between a loading position of the second type of optical disk in a first plane above the turntable, and a position proximate to the turntable; and a second carrying means disposed above the first carrying means and provided with a holder for holding the first type of optical disk, the holder being elevatably movable between a loading position of the first type of optical disk in a second plane above the first plane, and a position engaging the first type of optical disk for rotation by the turntable; and clamp means for selectably elevatably moving a clamper from a first position above the holder of the second carrying means, downwardly through said second plane, to clamp the second type of optical disk to the turntable when said second type of disk is to be reproduced.

* * * * *